(12) United States Patent
Lee

(10) Patent No.: US 10,509,195 B2
(45) Date of Patent: Dec. 17, 2019

(54) CAMERA MODULE INCLUDING APERTURE AND ELECTRONIC DEVICE INCLUDING THE SAME

(71) Applicant: Samsung Electronics Co., Ltd., Suwon-si, Gyeonggi-do (KR)

(72) Inventor: Kyung Bae Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/831,898

(22) Filed: Dec. 5, 2017

(65) Prior Publication Data

US 2018/0164538 A1 Jun. 14, 2018

(30) Foreign Application Priority Data

Dec. 8, 2016 (KR) .................. 10-2016-0166855

(51) Int. Cl.
| | |
|---|---|
| *G02B 9/08* | (2006.01) |
| *G02B 7/02* | (2006.01) |
| *G02B 7/09* | (2006.01) |
| *G02B 13/00* | (2006.01) |
| *H04N 5/225* | (2006.01) |
| *G03B 7/095* | (2006.01) |
| *G03B 9/06* | (2006.01) |

(52) U.S. Cl.
CPC .............. *G02B 7/09* (2013.01); *G02B 7/02* (2013.01); *G02B 13/00* (2013.01); *G02B 13/0015* (2013.01); *G03B 7/095* (2013.01); *G03B 9/06* (2013.01); *H04N 5/2254* (2013.01)

(58) Field of Classification Search
CPC . G02B 7/09; G02B 7/02; G02B 13/00; G02B 13/0015; G03B 7/00; G03B 7/095; G03B 9/06; H04N 5/2254
USPC ................. 359/738, 739, 808, 811, 818, 819
See application file for complete search history.

(56) References Cited

U.S. PATENT DOCUMENTS

| | | | | |
|---|---|---|---|---|
| 5,537,166 | A | * | 7/1996 | Keelan ..................... G03B 9/02 353/97 |
| 7,808,730 | B2 | | 10/2010 | Yoon |
| 8,254,008 | B2 | | 8/2012 | Jaitham et al. |
| 8,472,800 | B2 | | 6/2013 | Lee et al. |
| 2008/0037143 | A1 | | 2/2008 | Yoon |
| 2008/0075453 | A1 | | 3/2008 | Utz |
| 2011/0032592 | A1 | | 2/2011 | Okita |

(Continued)

FOREIGN PATENT DOCUMENTS

| | | |
|---|---|---|
| EP | 1 903 364 A1 | 3/2008 |
| JP | 2012-220584 A | 11/2012 |

(Continued)

OTHER PUBLICATIONS

International Search Report dated Mar. 21, 2018, issued in International Application No. PCT/KR2017/013956.

(Continued)

*Primary Examiner* — William Choi
(74) *Attorney, Agent, or Firm* — Jefferson IP Law, LLP

(57) ABSTRACT

A camera module is provided. The camera module includes a lens barrel including at least one lens and a lens hole, and a variable aperture including an aperture hole area which is arranged on the lens hole formed in the lens barrel, a size of the aperture hole area being is adjustable, and an electronic device including the same.

17 Claims, 25 Drawing Sheets

(56) References Cited

U.S. PATENT DOCUMENTS

2011/0164298 A1   7/2011  Jaitham et al.
2011/0293261 A1  12/2011  Lee et al.
2015/0098012 A1   4/2015  Kobayashi

FOREIGN PATENT DOCUMENTS

| KR | 10-2008-0083810 A | 9/2008 |
| KR | 10-2010-0001806 A | 1/2010 |
| KR | 10-2015-0075848 A | 7/2015 |
| KR | 10-2015-0080720 A | 7/2015 |
| KR | 10-2015-0089679 A | 8/2015 |
| KR | 10-2016-0020768 A | 2/2016 |

OTHER PUBLICATIONS

European Search Report dated Oct. 4, 2019, issued in European Patent Application No. 17877572.2.

\* cited by examiner

CAMERA MODULE INCLUDING APERTURE AND ELECTRONIC DEVICE INCLUDING THE SAME

CROSS-REFERENCE TO RELATED APPLICATION(S)

This application claims the benefit under 35 U.S.C. § 119(a) of a Korean patent application filed on Dec. 8, 2016 in the Korean Intellectual Property Office and assigned Serial number 10-2016-0166855, the entire disclosure of which is hereby incorporated by reference.

TECHNICAL FIELD

The present disclosure relates to a camera module of an electronic device.

BACKGROUND

In recent years, portable electronic devices in various forms, such as smartphones and tablet personal computers (PCs), have been increasingly distributed. The portable electronic devices may include a photographing function. In this regard, the portable electronic device may include a camera module.

The above information is presented as background information only to assist with an understanding of the present disclosure. No determination has been made, and no assertion is made, as to whether any of the above might be applicable as prior art with regard to the present disclosure.

SUMMARY

The portable electronic device has a limitation in size and thickness in consideration of portability of the related art, and the camera module included in the portable electronic device also has a limitation in size and thickness. Accordingly, the portable electronic device employs a camera module without some components of the related art, for example, an aperture. Because a camera module with no aperture cannot adjust the amount of light, a photographing function is limited.

Aspects of the present disclosure are to address at least the above-mentioned problems and/or disadvantages and to provide at least the advantages described below. Accordingly, an aspect of the present disclosure is to provide a camera module including an aperture, and an electronic device including the same.

As described above, various embodiments may provide a camera module that has various photographing modes or photographing functions by disposing an aperture while minimizing the thickness of an electronic device from increasing.

In accordance with an aspect of the present disclosure, a camera module is provided. The camera module includes a lens barrel including at least one lens and a lens hole, and a variable aperture including an aperture hole area which is arranged on the lens hole formed in the lens barrel, wherein a size of the aperture hole area is adjustable.

In accordance with another aspect of the present disclosure, an electronic device is provided. The electronic device includes a case, a camera module, at least a portion of which is exposed through a hole formed in the case, and a processor electrically connected to the camera module, wherein the camera module includes, a lens barrel including at least one lens and a lens hole, a variable aperture including an aperture hole area which is arranged on the lens hole formed in the lens barrel, and a size of the aperture hole area being adjustable, and an aperture driving module configured to control adjustment of the size of the aperture hole area.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
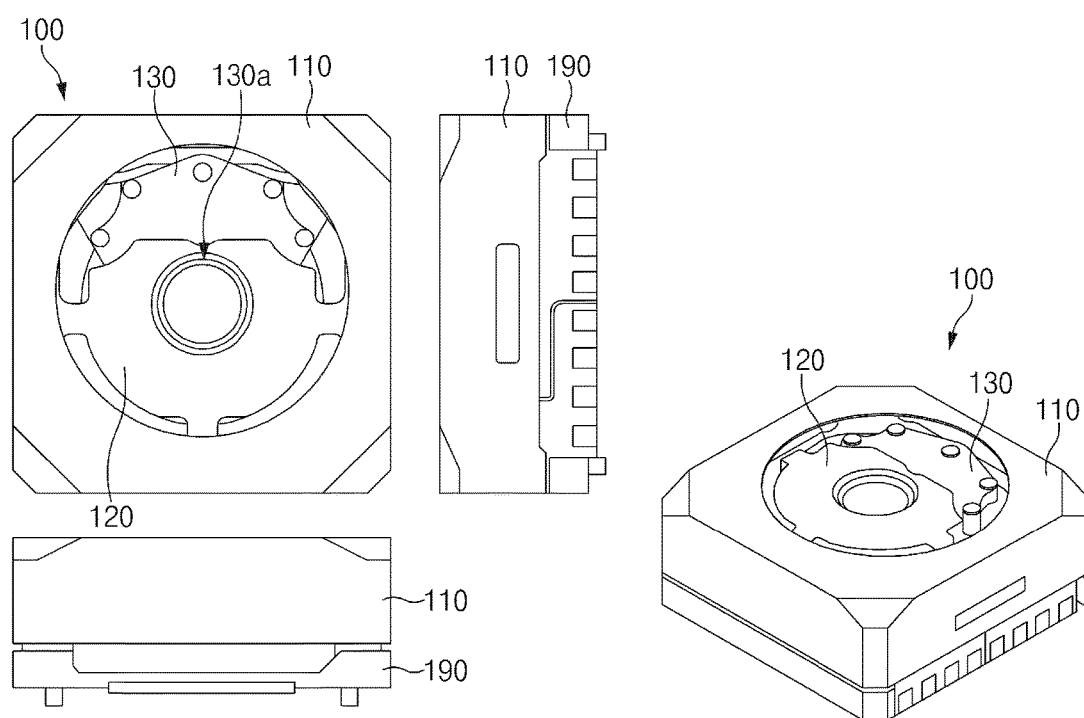
FIG. 1 is a view illustrating an example of an external appearance of a camera module according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments, but do not limit the elements. Furthermore, such terms may be used to distinguish one element from another element. For example, "a first user device" and "a second user device" may indicate different user devices regardless of the order or priority thereof. For example, "a first user device" and "a second user device" indicate different user devices.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. Central processing unit (CPU), for example, a "processor configured to perform A, B, and C" may mean a dedicated processor (e.g., an embedded processor) for performing a corresponding operation or a generic-purpose processor (e.g., a CPU or an application processor (AP)) which may perform corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, e-book readers, desktop PCs, laptop PCs, netbook computers, workstations, servers, personal digital assistants (PDAs), portable multimedia players (PMPs), Motion Picture Experts Group (MPEG-1 or MPEG-2) audio layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart watches, or the like.

According to another embodiment, the electronic devices may be home appliances. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, or the like.

According to another embodiment, the photographing apparatus may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to another embodiment, the electronic devices may include at least one of parts of furniture or buildings/structures, electronic boards, electronic signature receiving devices, projectors, or various measuring instruments (e.g., water meters, electricity meters, gas meters, or wave meters, and the like). In the various embodiments, the electronic device may be one of the above-described various devices or a combination thereof. An electronic device according to an embodiment may be a flexible device. Furthermore, an electronic device according to an embodiment may not be limited to the above-described electronic devices and may include other electronic devices and new electronic devices according to the development of technologies.

Hereinafter, an electronic device according to the various embodiments may be described with reference to the accompanying drawings. The term "user" used herein may refer to a person who uses an electronic device or may refer to a device (e.g., an artificial intelligence electronic device) that uses an electronic device.

FIG. 1 is a view illustrating an example of an external appearance of a camera module according to an embodiment of the present disclosure.

Figure 2:
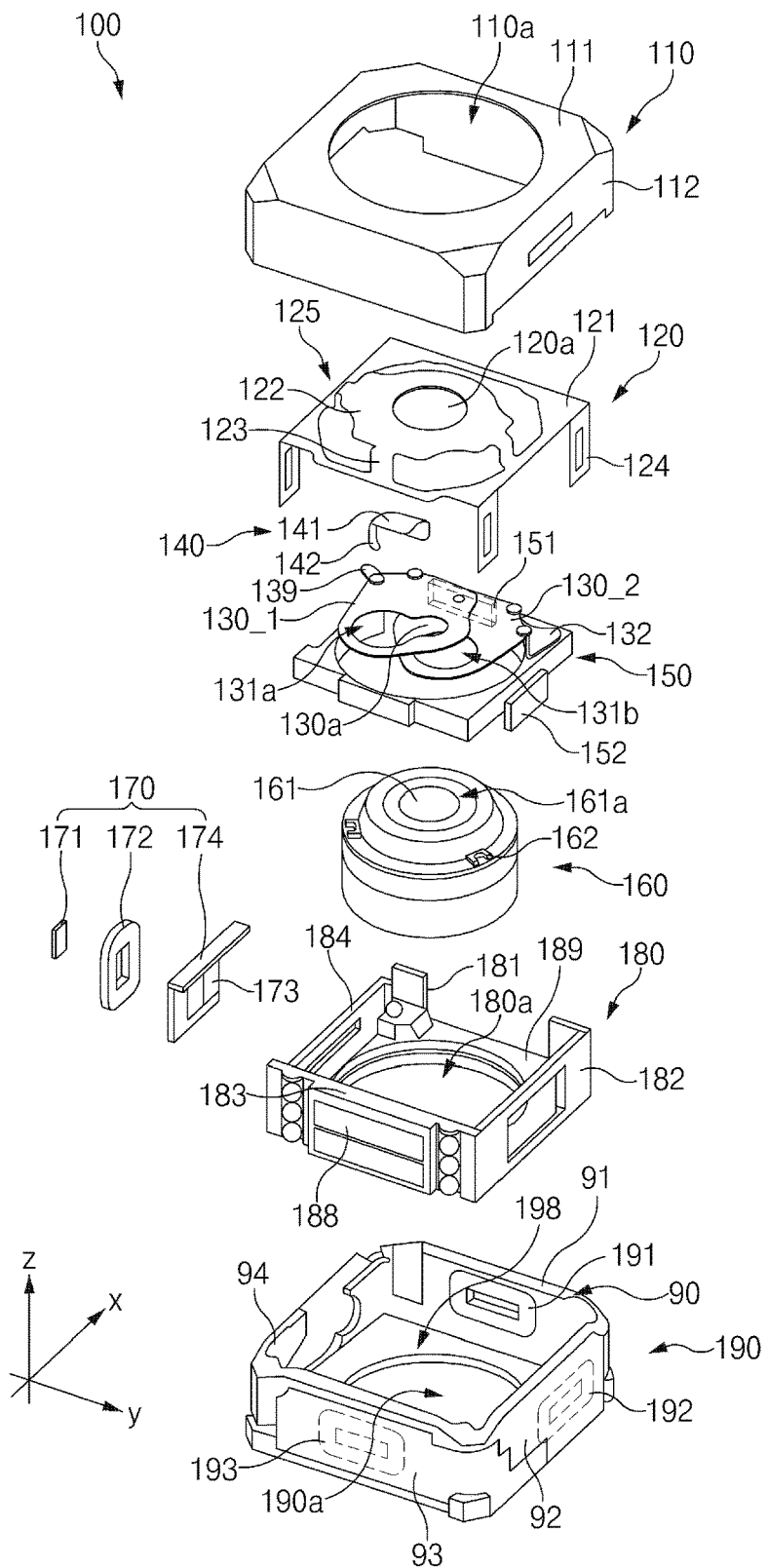
FIG. 2 is a view illustrating an example of an exploded perspective view of another camera module according to an embodiment of the present disclosure.

FIG. 2 is a view illustrating an example of an exploded perspective view of another camera module according to an embodiment of the present disclosure.

Referring to FIGS. 1 and 2, the camera module 100 according to the embodiment of the present disclosure may include a shield can 110, a stopper 120, a variable aperture 130, an aperture fixing unit 140, a first movable carrier 150, a lens barrel 160, a second movable carrier 180, an aperture driving module 170, and a housing 190. In the above-described camera module 100, the variable aperture 130 may be is disposed on the lens barrel 160, and the size of an aperture hole area 130a of the variable aperture 130 may be adjusted by the aperture driving module 170. For example, the camera module 100 may change an adjustment state of the variable aperture 130 according to a photographing function (or a photographing mode). For example, the camera module 100 may be adjusted such that the size of the aperture hole area 130a may be maximized when a first photographing function (e.g., a pan-focusing function) is executed. The camera module 100 may be adjusted such that the size of the aperture hole area 130a may be minimized when a second photographing function (e.g., an out focus function) is executed.

According to various embodiments, the camera module 100 may be adjusted such that the size of the aperture hole area 130a of the variable aperture 130 may correspond to a specific size area between a maximum value and a minimum value. The above-described camera module 100 according to the present disclosure may have a state in which the variable aperture 130 is disposed together with the first movable carrier 150, to which the lens barrel 160 is coupled, while being disposed on the lens barrel 160. Accordingly, the camera module 100 may include the variable aperture 130 that may be moved in the X-axis, Y-axis, or Z-axis direction in correspondence to the movement of the lens barrel 160. The camera module 100 with the above-described structure may minimize the height of the camera module 100 by minimizing a gap between an uppermost end of the lens barrel 160 and the aperture hole area 130a of the variable aperture 130 while the variable aperture 130 is disposed on the lens barrel 160.

The shield can 110 may cover the camera module 100 from the upper side to the lower side as a whole. For example, the shield can 110 may include an upper surface 111, and shield can side walls 112 disposed at a periphery of the upper surface 111, and a lower surface of the shield can 110 may be opened. The upper surface 111 of the shield can 110 may have a shield can hole 110a of a specific size such that at least a portion of the lens 161 disposed at a central portion of the lens barrel 160 may be exposed. The shield can side walls 112 may be coupled to a periphery of the housing 190 of the camera module 100 to function to fix the configurations (e.g., the stopper 120, the variable aperture 130, the aperture fixing unit 140, the first movable carrier 150, the lens barrel 160, the second movable carrier 180, and the aperture driving module 170) seated in the interior of the shield can 190. The shield can 110, for example, may be formed of a metallic material or may be formed of a material (e.g., reinforced plastics) having a hardness of a specific value or more.

The stopper 120 may be disposed between the shield can 110 and the variable aperture 130 to prevent the variable aperture 130 from deviating in one direction (e.g., the Z-axis direction or the upward direction). In this regard, the stopper 120 may include an upper substrate 125 and leads 124. The upper substrate 125 may include a peripheral area 121 having a polygonal band (e.g., a rectangular band) shape, a central portion of which is empty, and a stopper substrate 122 including a stopper hole 120a that is provided at a central portion thereof to have a specific size such that the aperture hole area 130a of the variable aperture 130 may be exposed. The stopper substrate 122 may be connected and fixed to one side of the peripheral area 121 through a connecting portion 123. Further, the stopper substrate 122 may be disposed on an upper side, which is spaced apart from the peripheral area 121 by a specific height (e.g., the height of the connecting portion 123) through the connecting portion 123. The stopper substrate 122 is spaced apart from the variable aperture 130 by a specific interval due to the height of the connecting portion 123 to allow upward and downward movements of the variable aperture 130. The leads 124 may be formed on sides (e.g., corner areas) of the peripheral area 121 to have a vertical length and a width. According to an embodiment, the leads 124 may have a band shape, a central portion of which is empty. The leads 124 may be coupled to one side of the first movable carrier 150 or the second movable carrier 180.

The variable aperture 130 may include two wing parts 130_1 and 130_2. The wing parts 130_1 and 130_2 may partially overlap each other. The overlapping wing parts 130_1 and 130_2 may be fixed to be rotated in a specific angle range. Each of the wing parts 130_1 and 130_2 may include wing holes 131a and 131b having different sizes and portions of which overlap each other, at a central portion thereof. The wing holes 131a and 131b partially overlap each other to form the central aperture hole area 130a. The wing holes 131a and 131b may have a shape in which at least portions of holes having different sizes overlap each other, for example, a roly poly or a snowman. According to various embodiments, the wing holes 131a and 131b may include a plurality of holes that are spaced apart from each other by a specific interval.

The wing parts 130_1 and 130_2 may be engaged with each other to be moved in a direction in which they become far away from each other or closer to each other in a specific angle range. For example, when the wing parts 130_1 and 130_2 are moved in a direction in which they become closer to each other (or a direction in which an overlapping range of the wing parts 130_1 and 130_2 becomes larger), the aperture hole area 130a may increase, and when the wing parts 130_1 and 130_2 are moved in a direction in which they becomes far away from each other (or a direction in which an overlapping range of the wing parts 130_1 and 130_2 becomes smaller), the aperture hole area 130a may decrease. The above-described wing parts 130_1 and 130_2 are seated on one side of the first movable carrier 150, and may be rotated in specific angle ranges, respectively.

The aperture fixing unit 140 may be provided such that a periphery of one side of the variable aperture 130 is fixed to the first movable carrier 150 and the variable aperture 130 may be rotated in a specific range. For example, the aperture fixing unit 140 may be provided such that a lever 139 used to rotate the variable aperture 130 in a specific range may be moved in a specific range while a wing holder 132 disposed on one side of the wing part of the variable aperture 130 is fixed to the first movable carrier 150 (e.g., fixed to prevent upward and downward movement of the wing part holder 132). In this regard, the aperture fixing unit 140 may include a cover 141 disposed to cover an upper surface of a corner area of the variable aperture 130 to prevent deviation of the variable aperture 130 in the Z-axis direction, and a side lead 142 disposed to overlap a side of the corner area of the variable aperture 130 to move the lever 139 at a specific angle while preventing deviation of the variable aperture 130 in the X-axis direction or Y-axis direction (or a specific direction on a horizontal plane).

The first movable carrier 150 is provided such that an inner central portion is empty and an upper side of the lens barrel 160 is disposed in the inner central portion, the variable aperture 130 is seated on and fixed to an upper side of the first movable carrier 150, and the first movable carrier 150 may be coupled to the variable aperture 130 such that the wing parts 130_1 and 130_2 of the variable aperture 130 may be rotated in a specific angle range. The lens barrel 160 may be fixed to an inside of the first movable carrier 150, and a first magnet member 151 and a second magnet member 152 (e.g., hand-shaking compensating magnet members) disposed on at least two outer sides of the first movable carrier 150 may be disposed. The at least two outer sides may include sides that share corners. The first magnet member 151 and the second magnet member 152 for compensating hand-shaking may form pairs with hand-shaking compensation related coils (e.g., coils 191 and 192 disposed on one side of the housing 190) disposed in the second movable carrier 180 such that the first movable carrier 150, to which the lens barrel 160 is fixed, may be moved in the X-axis or Y-axis direction.

The lens barrel 160 has a tub shape, the interior of which is empty, and has the same or similar diameter from the bottom to a specific height thereof, the diameter of the lens barrel 160 gradually decreases as it goes from the specific height to an upper side, and the lens hole 161a is disposed at an upper end of the lens barrel 160. One or more lenses are disposed in the interior of the lens barrel 160 to be spaced vertically apart from each other by a specific interval. At least a portion of the uppermost lens 161 of the lenses disposed in the interior of the lens barrel 160 may be exposed to the outside through the lens hole 161a. According to an embodiment, the lens 161 may have a convex shape, and may protrude further to the upper side than to a periphery of the lens hole 161a. A fixing recess or a fixing boss 162, by which the first movable carrier 150 is fixed, may be disposed on one side of the lens barrel 160. The lens barrel 160 fixed to the first movable carrier 150 may be moved in the X-axis and Y-axis directions (e.g., a specific direction on the horizontal plane) due to an interaction between the first magnet member 151 and the second magnet member 152 disposed in the first movable carrier 150 and the coils (e.g., the first coil 191 and the second coil 192) disposed on one side of the housing 190.

A through-hole 180a of a specific size or more may be provided at a central portion of the second movable carrier 180, and the second movable carrier 180 may include a frame 189 that forms the through-hole 180a, and one or more carrier side walls 181, 182, 183, and 184 extending from a periphery of the frame 189 to the upper side. For example, the carrier side walls 181, 182, 183, and 184 may include a first carrier side wall 181 formed such that the first magnet member 151 for moving the lens barrel 160 in the X-axis direction is exposed, a second carrier side wall 182 formed such that the second magnet member 152 for moving the lens barrel 160 in the Y-axis direction is exposed, a third carrier side wall 183 formed such that the third magnet member 188 for moving the lens barrel 160 in the Z-axis direction is disposed on the outside, and a fourth side wall 184 in which an aperture driving module 170 related to adjustment of the wing parts 130_1 and 130_2 of the variable aperture 130 is disposed. The lens barrel 160, to which the first movable carrier 150 is coupled, may be seated inside the above-described second movable carrier 180.

The aperture driving module 170, for example, may include a support 174 disposed on one side of the variable aperture 130, coupled to the lever 139 configured to deliver a force to move the variable aperture 130 in a specific angle range, and configured to move the lever 139 in a specific direction (e.g., in one direction on the horizontal plane, for example, the X-axis direction), a fourth magnet member 173 disposed in the support 174, an aperture coil 172 configured to move the fourth magnet member 173 in a specific direction (e.g., the X-axis direction), and an aperture driving IC 171 configured to control supply of electric power to the aperture coil 172. The aperture driving IC 171 and the aperture coil 172, for example, may be fixed to one side of the housing 190. Further, the support 174, in which the fourth magnet member 173 is disposed, may be attached and fixed to one side (e.g., the fourth carrier side wall 184) of the second movable carrier 180.

A seating part 198, in which the above-described configurations, for example, the stopper 120, the variable aperture 130, the aperture fixing unit 140, the first movable carrier 150, the lens barrel 160, the second movable carrier 180, and the seating part 198 in which the aperture driving module 170 are seated, and housing side walls 90 surrounding the above-described configurations may be disposed in the housing 190. The seating part 198 may include a seating part hole 190a, through which a central portion of the lens barrel 160 is exposed downwards, at a central portion thereof. An image sensor, for example, may be disposed under the seating part hole 190a.

The housing side walls 90 may be disposed at peripheries of the seating part 198 while sharing the corners. The housing side walls 90, for example, may include a first housing side wall 91 in which the first coil 191 mutually operated with the first magnet member 151 disposed in the first movable carrier 150 is disposed such that the lens barrel 160 may be moved in the X-axis direction, a second housing side wall 92 in which the second coil 192 mutually operated with the second magnet member 152 disposed in the first movable carrier 150 is disposed such that the lens barrel 160 may be moved in the Y-axis direction, a third housing side wall 93 in which the third coil 193 mutually operated with the third magnet member 188 disposed in the first movable carrier 150 is disposed such that the lens barrel 160 may be moved in the Z-axis direction, and a fourth housing wall 94 in which the aperture coil 172 mutually operated with the fourth magnet member 173 is disposed. The housing side walls 90 may protect the configurations related to the above-described camera module while being coupled to the shield can side walls 112.

The above-described camera module 100 according to the present disclosure may have a structure in which the variable aperture 130 also may be moved as the lens barrel 160 is moved, by employing a structure in which the variable aperture 130 is fixed to the lens barrel 160 while the variable aperture 130 is disposed on the lens barrel 160. Accordingly, the arrangement state of the lens barrel 160 and the variable aperture 130 may be maintained regardless of movement of the lens barrel 160 (e.g., movement related to compensation of hand shaking or movement related to auto-focusing). Further, the camera module 100 according to the present disclosure may minimize the vertical thickness of the camera module 100 by aligning the aperture hole area 130a of the variable aperture 130 with the uppermost lens 161 disposed inside the lens barrel 160 and exposing at least a portion of the uppermost lens 161 having a convex shape through the aperture hole area 130a (e.g., making an end of the convex surface of the uppermost lens 161 protrude further than a surface of the variable aperture 130).

Figure 3:
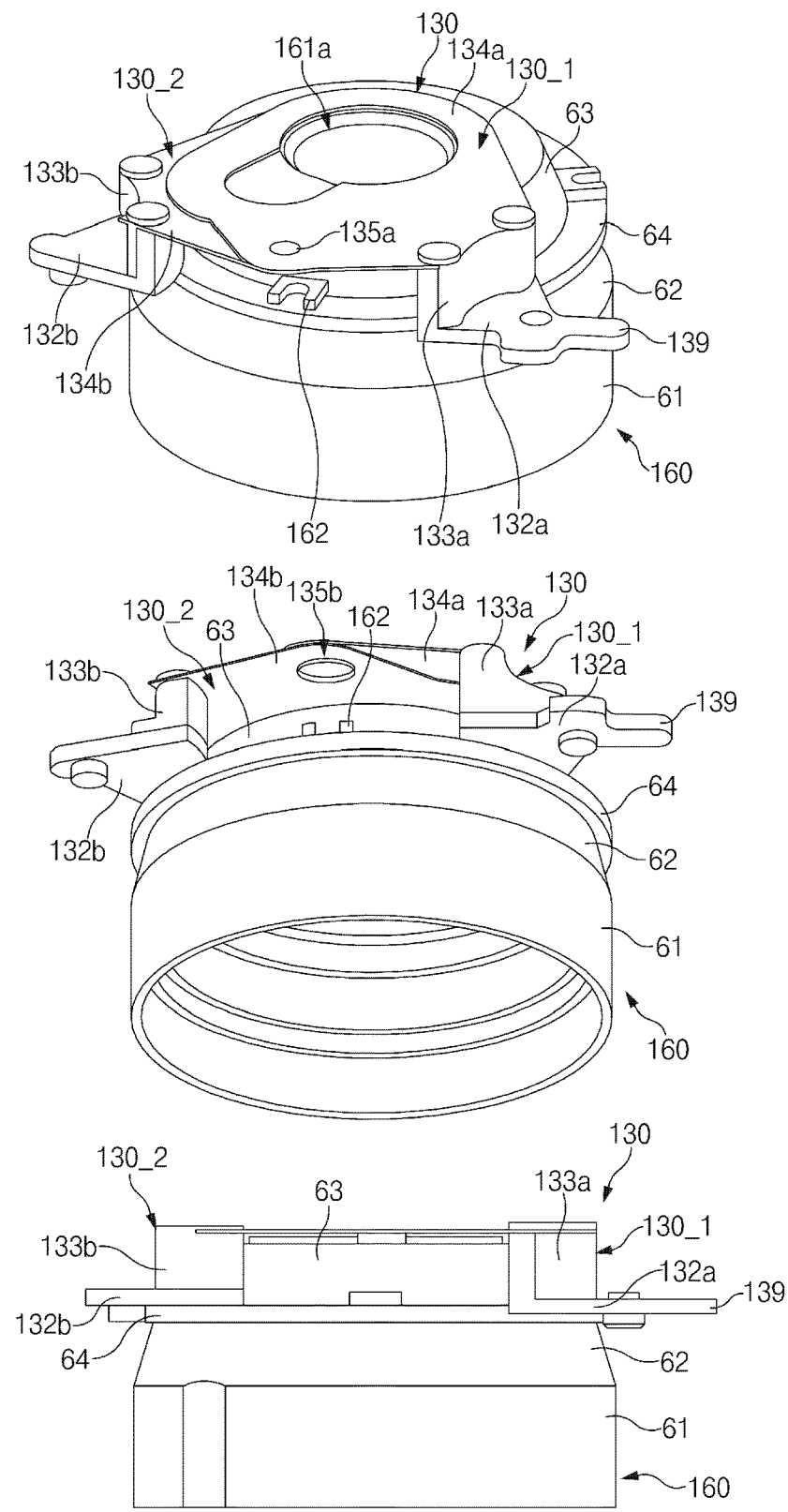
FIG. 3 is a view illustrating an example of a lens barrel, on which a variable aperture is mounted, according to an embodiment of the present disclosure.

FIG. 3 is a view illustrating an example of a lens barrel, on which a variable aperture is mounted, according to an embodiment of the present disclosure.

Figure 4:
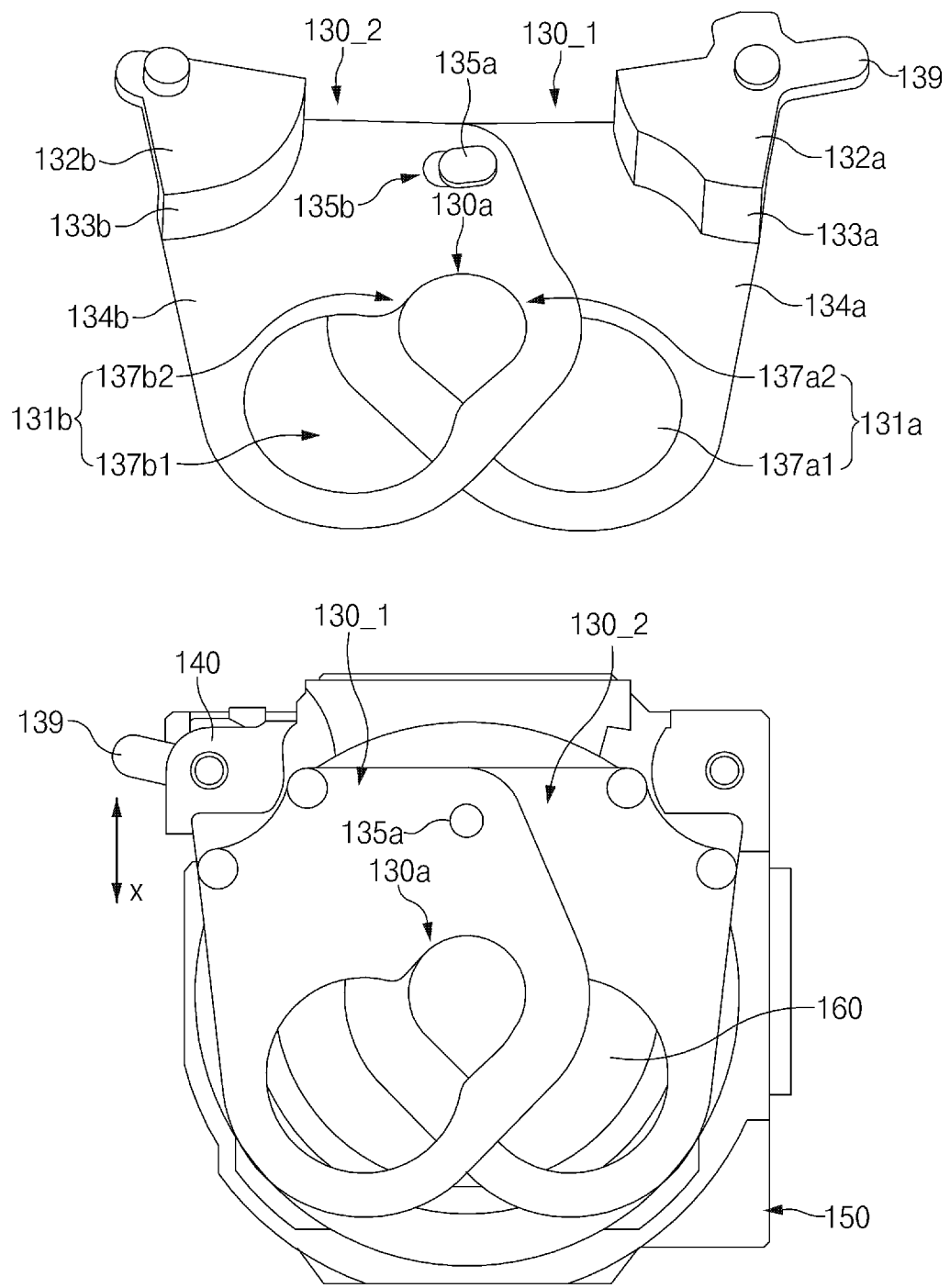
FIG. 4 is a view illustrating an example of a variable aperture, a first movable carrier, and a lens barrel of a camera module according to an embodiment of the present disclosure.

FIG. 4 is a view illustrating an example of a variable aperture, a first movable carrier, and a lens barrel of a camera module according to an embodiment of the present disclosure.

Figure 5A:
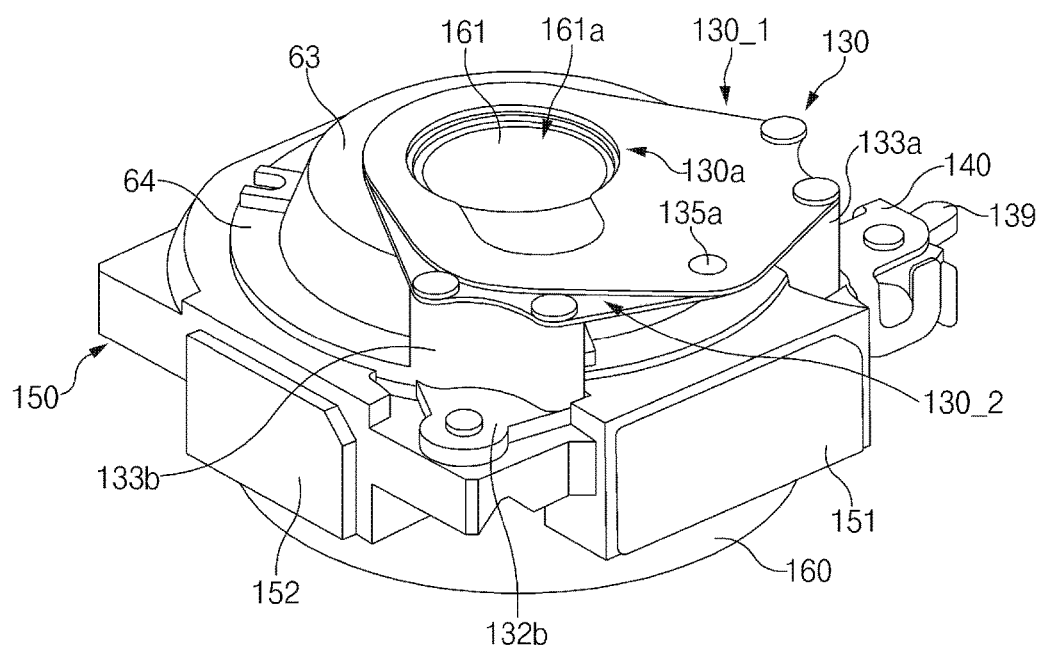
FIGS. 5A and 5B are views illustrating an example of a configuration related to a change of a state of a variable aperture according to an embodiment of the present disclosure.
Figure 5B:
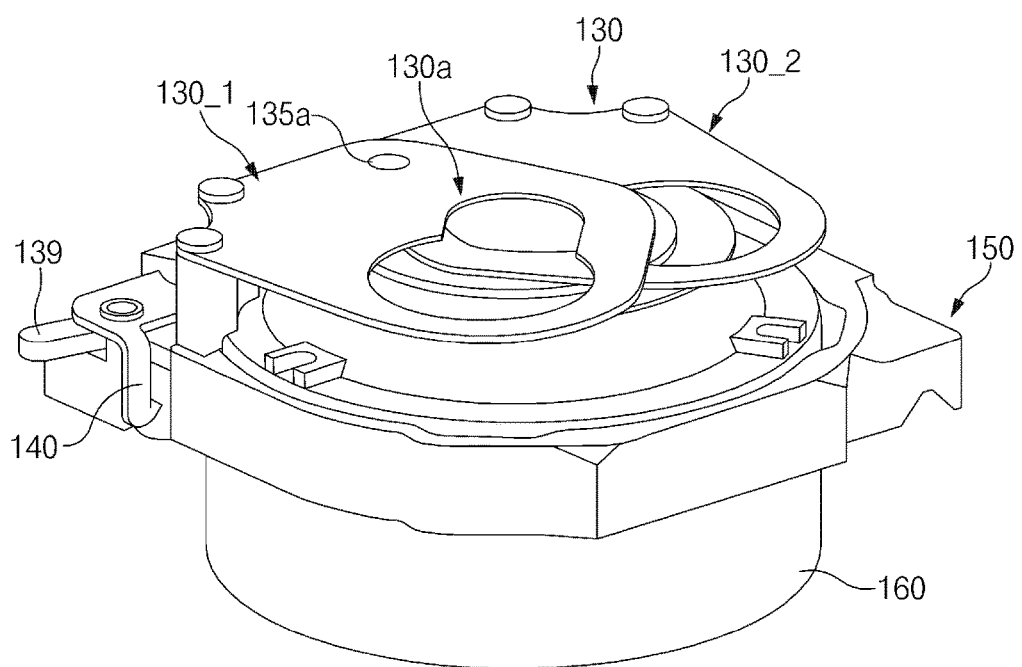

FIGS. 5A and 5B are views illustrating an example of a configuration related to a change of a state of a variable aperture according to an embodiment of the present disclosure.

Referring to FIGS. 3 to 5B, in the camera module according to an embodiment of the present disclosure, the variable aperture 130 may be seated on one side of the lens barrel 160.

As illustrated, the lens barrel 160 according to an embodiment of the present disclosure may include a lower barrel 61 having a cylindrical shape of a first diameter, a middle barrel 62 having a second diameter which gradually decreases from an upper side of the lower barrel 61, an aperture holder 64 having a cylindrical band shape that protrudes from an upper side of the middle barrel 62, and an upper barrel 63 disposed on the aperture holder 64 and having a diameter that is smaller than that of the middle barrel 62, the diameter of the upper barrel 63 gradually decreasing toward the upper side. A lens hole 161a, through which light irradiated from the outside is introduced into the lens barrel 160, may be disposed on an upper surface of the upper barrel 63.

At least one wrinkle may be disposed on an inner wall of the lower barrel 61. A periphery of at least one lens may be held in the wrinkle. Similarly, at least one wrinkle also may be disposed on each of an inner wall of the middle barrel 62 and an inner wall of the upper barrel 63, and a periphery of at least one lens may be held in the wrinkles disposed on the inner walls of the middle barrel 62 and the upper barrel 63.

Fixing bosses 162 each having a recess of a specific size may be disposed on one side of an upper surface of the aperture holder 64. The fixing bosses 162, for example, may be used for coupling to the stopper 120. According to an embodiment, sides of the connecting portions 123 provided in the stopper 120 may be seated on the recesses of the fixing bosses 162. According to various embodiments, the variable aperture 130 may be seated on the aperture holder 64.

As described above, the variable aperture 130 may include a first wing part 130_1 and a second wing part 130_2. The first wing part 130_1, for example, may include a first wing 134a, a first wing support 133a connected to the first wing 134a, a first wing holder 132a connected to the first wing support 133a, a lever 139, and a connection boss 135a. The second wing part 130_2, for example, may include a second wing 134b, a second wing support 133b connected to the second wing 134b, a second wing holder 132b connected to the second wing support 133b, and a connection hole 135b.

The first wing 134a, for example, may have various shapes, for example, a polygonal shape while having a specific thickness. A first upper hole 137a2 and a first lower hole 137a1 may be disposed on one side of the first wing 134a, and the first upper hole 137a2 and the first lower hole 137a1 may partially overlap each other. The diameter of the first upper hole 137a2 and the diameter of the first lower hole 137a1 may be different. According to an embodiment, the diameter of the first upper hole 137a2 may be smaller than the diameter of the first lower hole 137a1. Accordingly, the first upper hole 137a2 and the first lower hole 137a1 may have a roly poly shape, a snowman shape, or a figure eight shape. According to various embodiments, the first lower hole 137a1 and the first upper hole 137a2 may be spaced apart from the first wing 134a by a specific interval. For example, the first lower hole 137a1 may be a circular hole of a first size, the second upper hole 137a2 may be a circular hole of a second size (e.g., which is the same as or smaller than the first size), and the first lower hole 137a1 and the first upper hole 137a2 may be spaced apart from each other.

Similarly, the second lower hole 137*b*1 and the second upper hole 137*b*2 may be independent circular holes. In this case, the first lower hole 137*a*1 and the second lower hole 137*b*1 may overlap each other while the wing parts 130_1 and 130_2 are rotated to maximally overlap each other, and the first upper hole 137*a*2 and the second upper hole 137*b*2 may overlap each other while the wing parts 130_1 and 130_2 are rotated to minimally overlap each other.

As the wing parts 130_1 and 130_2 are moved, the first upper hole 137*a*2 may be disposed on the center point of the lens hole 161*a*. Then, the first upper hole 137*a*2 may be disposed on the lens hole 161*a* while overlapping the second upper hole 137*b*2 provided in the second wing 134*b*. As the wing parts 130_1 and 130_2 are moved, the first lower hole 137*a*1 may be disposed on the center point of the lens hole 161*a*. Then, the first lower hole 137*a*1 may be disposed on the lens hole 161*a* while overlapping the second lower hole 137*b*1 provided in the second wing 134*b*.

The first wing support 133*a* may extend from a periphery of one side of the first wing 134*a* while having a specific angle (e.g., a vertical angle) with a surface of the first wing 134*a*. The first wing support 133*a* has a cylindrical shape having a specific thickness and a specific width, and may be convex toward the lens barrel 160. A lower side of the above-described wing support 133*a* may be held on the aperture holder 64. As the height of the first wing support 133*a*, for example, is larger than the height of the upper barrel 63, the first wing 134*a* may be spaced apart from the front surface of the upper barrel 63 at a designated interval.

The first wing holder 132*a* is connected to a lower side of the first wing support 133*a* and may extend from the center of the lens barrel 160 outwards while having a specific area. Accordingly, for example, the first wing part 130_1 may function to prevent the variable aperture 130 from deviating in the Z-axis direction while being at least partially covered by the stopper 120. The first wing holder 132*a* may be disposed on one side of an upper portion of the first movable carrier 150.

The lever 139 may protrude from one side of the first wing holder 132*a* in a specific direction. The lever 139 may move in a specific direction (e.g., forwards and rearwards in the X-axis direction) through driving of the aperture driving module 170 while being coupled to the aperture driving module 170. The lever 139 may transmit a force that moves the first wing holder 132*a* while moving in one direction through driving of the aperture driving module 170, and the first wing 134*a* connected to the first wing support 133*a* may be rotated in a specific angle range while the force due to the movement of the first wing holder 132*a* is transmitted to the first wing support 133*a*. The first upper hole 137*a*2, the first lower hole 137*a*1, or the area in which the first upper hole 137*a*2 and the first lower hole 137*a*1 overlap each other may be positioned on the lens hole 161*a* in correspondence to the rotation of the first wing 134*a*.

The connection boss 135*a* may be disposed on one side of the first wing 134*a*, and may be disposed in a specific area in which the first wing 134*a* overlaps the second wing 134*b*. According to an embodiment, the connection boss 135*a* may protrude toward a rear surface of the first wing 134*a*, and may be inserted into the connection hole 135*b* provided on one side of the second wing 134*b*. The connection boss 135*a* may move in the connection hole 135*b* along the shape of the connection hole 135*b*. Accordingly, a rotational force is transmitted to the connection boss 135*a* while the first wing 134*a* is rotated in a specific angle range, and the second wing 134*b* including the connection hole 135*b* may be rotated in a specific angle range in correspondence to the movement of the connection boss 135*a*.

The second wing 134*b* may have a shape that is substantially the same as or similar to that of the first wing 134*a*, except for the connection hole 135*b*. For example, the second wing 134*b* may include a second upper hole 137*b*2 and a second lower hole 137*b*1. The second upper hole 137*b*2 and the second lower hole 137*b*1 may at least partially overlap each other, and the second upper hole 137*b*2 may have a diameter that is larger than that of the second lower hole 137*b*1. The second upper hole 137*b*2 may be disposed on the lens hole 161*a* to at least partially overlap the first upper hole 137*a*2 as the second wing 134*b* is rotated. Similarly, the second lower hole 137*b*1 may be disposed on the lens hole 161*a* to at least partially overlap the first lower hole 137*a*1 as the second wing 134*b* is rotated.

The second wing support 133*b* is disposed on one side of the second wing 134*b*, and may extend perpendicularly to a surface of the second wing 134*b* while having a specific thickness and a specific width. The second wing holder 132*b* may be connected to a lower side of the second wing support 133*b*. A lower side of the second wing support 133*b* may be seated on an upper surface of the aperture holder 64 of the lens barrel 160, and may move along the upper surface of the aperture holder 64 in a specific angle range. The second wing support 133*b* has a shape that is similar to or the same as that of the first wing support 133*a*, and may be disposed to be symmetrical to the first wing support 133*a* with respect to the lens hole 161*a*.

The second wing holder 132*b* may be disposed under the second wing support 133*b* to have a specific area. The second wing holder 132*b* may prevent the variable aperture 130 from deviating in the Z-axis direction while being covered by one side of the stopper 120. The second wing holder 132*b* may have a shape that is substantially similar to or the same as that of the first wing holder 132*a*, except for an area of the lever 139. The second wing holder 132*b* may be seated on an upper surface of the first movable carrier 150.

The connection hole 135*b* may be provided on one side of the second wing 134*b* while having a specific length. The connection boss 135*a* provided in the first wing 134*a* may be inserted into the connection hole 135*b*. The connection boss 135*a* seated in the connection hole 135*b* may be moved along an inner peripheral surface of the connection hole 135*b* by a specific distance. The connection hole 135*b* may have a curved shape. Accordingly, while the first wing 134*a* is rotated in a specific angle range, the second wing 134*b* may be rotated at a specific angle while the connection boss 135*a* is moved along the curved inner peripheral surface of the connection hole 135*b*.

The size of the overlapping area of the first wing part 130_1 and the second wing part 130_2, which have been described above, may vary in correspondence to control of the aperture driving module 170 coupled to the lever 139. According to an embodiment, the first wing part 130_1 and the second wing part 130_2 may overlap each other maximally while the first lower hole 137*a*1 of the first wing part 130_1 and the second lower hole 137*b*1 of the second wing part 130_2 overlap each other on the lens hole 161*a*. As a periphery of the first wing 134*a* contacts a boss formed in the second wing support 133*b* while the first lower hole 137*a*1 and the second lower hole 137*b*1 overlap each other, the first wing 134*a* and the second wing 134*b* may be fixed not to moved further in a specific direction. Further, the first wing part 130_1 and the second wing part 130_2 may overlap each other minimally while the first upper hole 137*a*2 of the first wing part 130_1 and the second upper hole 137*b*2 of the second wing part 130_2 overlap each other on the lens hole 161*a*. Then, a minimum overlapping area of the first wing 134*a* and the second wing 134*b* may be fixed according to a coupling state of the connection hole 135*b* and the connection boss 135*a*.

The first movable carrier 150 may be fixedly coupled to the middle barrel 62 of the lens barrel 160, the aperture holder 64 and the upper barrel 63 are exposed to the upper side, and the lower barrel 61 may be exposed to the lower side. Sides of the wing holders of the variable aperture 130 may be seated on the first movable carrier 150. According to an embodiment, the first wing holder 132*a* of the first wing 134*a* may be seated on one side of the first movable carrier 150, and the aperture fixing unit 140 may be disposed on the upper side of the first movable carrier 150 while covering the first wing holder 132*a*. Then, the lever 139 extending from the first wing holder 132*a* may protrude in one direction through a recess provided in the aperture fixing unit 140.

Figure 6A:
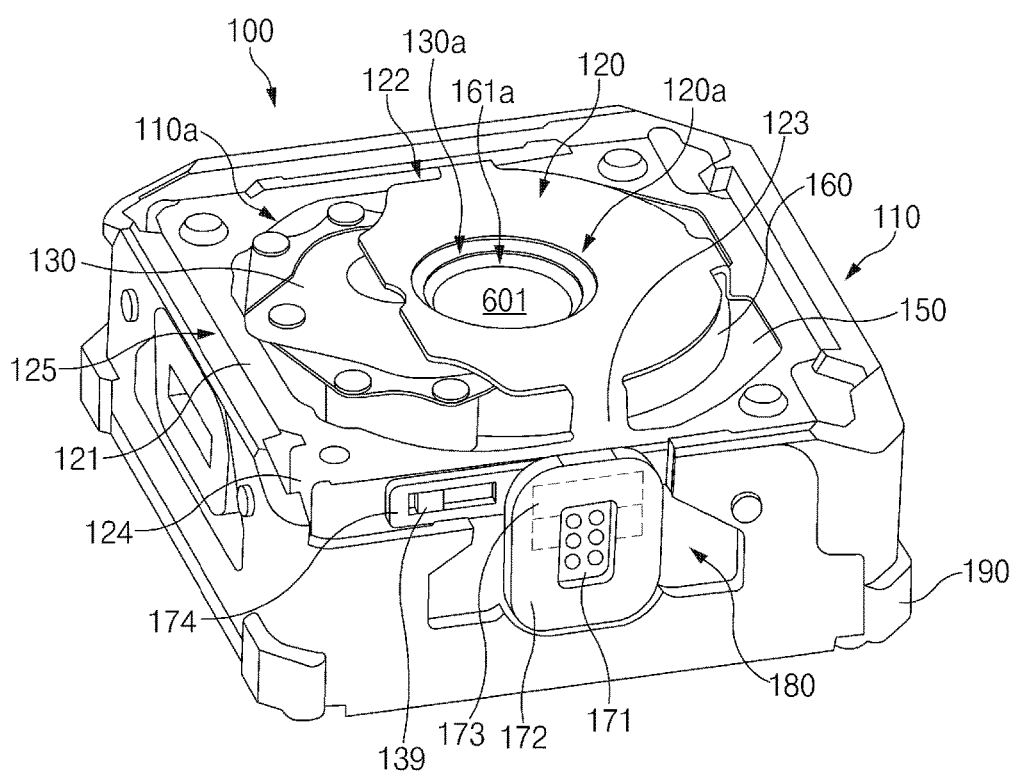
FIG. 6A is a view illustrating a first state of a camera module according to a change of a variable aperture according to an embodiment of the present disclosure.

FIG. 6A is a view illustrating a first state of a camera module according to a change of a variable aperture according to an embodiment of the present disclosure.

Figure 6B:
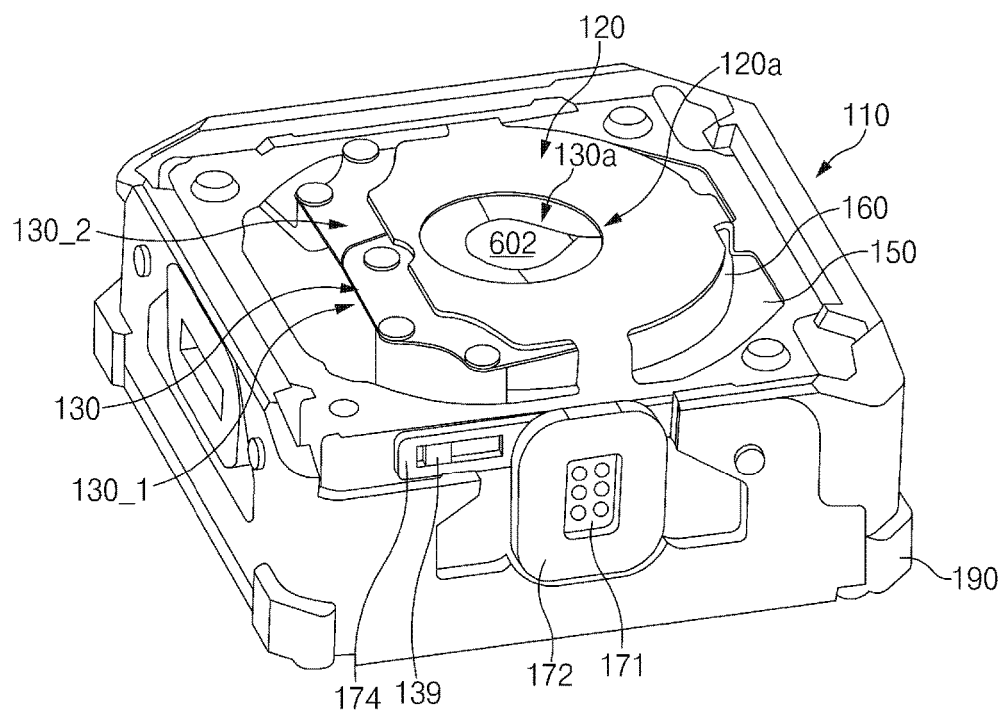
FIG. 6B is a view illustrating a second state of a camera module according to a change of a variable aperture according to an embodiment of the present disclosure.

FIG. 6B is a view illustrating a second state of a camera module according to a change of a variable aperture according to an embodiment of the present disclosure.

Referring to FIGS. 6A and 6B, the camera module 100 according to an embodiment of the present disclosure, the shield can 110 having a shield can hole 110*a* of a specific size at a central portion thereof surrounds the outside of the camera module 100 and the above-mentioned housing 190 may be disposed in the interior of the shield can 110. The lens barrel 160, to which the first movable carrier 150 and the second movable carrier 180 are coupled, may be seated in the housing 190, and the stopper 120, a central portion of which protrudes to the outside through the shield can hole 110*a* may be disposed in the interior of the shield can 110. The peripheral area 121 and the leads 124 of the upper substrate 125 of the stopper 120 may be disposed under the shield can 110, and the stopper substrate 122 and the connecting portions 123 of the upper substrate 125 may be exposed to the outside through the shield can hole 110*a*. The stopper hole 120*a* may be arranged on the lens hole 161*a* of the lens barrel 160 such that the lens hole 161*a* may be exposed to the upper side. The size of the stopper hole 120*a*, for example, may be the same as or larger than the size of the lens hole 161*a*. Further, according to design, the stopper hole 120*a* may have a size that is smaller than the size of the lens hole 161*a*.

The aperture driving module 170 may be disposed on one side of the housing 190. An area of a side of the shield can 110 may be removed such that at least a portion (e.g., the aperture coil 172 or the aperture driving IC 171) of the aperture driving module 170 disposed on one side of the housing 190 may be exposed to the outside. The aperture coil 172 or the aperture driving IC 171 exposed through the removed side of the shield can 110, for example, may be connected to a control unit of the electronic device, on which the camera module 100 is mounted. A current of a specific direction may be supplied to the aperture coil 172 under the control of the aperture driving IC 171. If electric current flows to the aperture coil 172 in a specific direction, the fourth magnet member 173 disposed in the support 174 may move the support 174 in a first direction. If electric current flows to the aperture coil 172 in another direction, the fourth magnet member 173 disposed in the support 174 may move the support 174 in a second direction. According to an embodiment, the support 174 may move forwards and rearwards with respect to a transverse direction on a side of the shield can 110. The lever 139 may be moved through forward and rearward movement of the support 174.

If the lever 139 is moved in one direction (e.g., a rightward direction with respect to a point at which the aperture coil 172 is disposed in the illustrated drawing) through the motion of the support 174, the first wing part 130_1 and the second wing part 130_2 may be moved in a direction in which the overlapping area increases as in a first state (e.g., state 601, a state in which the first lower hole 137*a*1 of the first wing 134*a* and the second lower hole 137*b*1 of the second wing 134*b* completely overlap each other) illustrated in FIG. 6A. Accordingly, the first lower hole 137*a*1 provided in the first wing 134*a* and the second lower hole 137*b*1 provided in the second wing 134*b* may be exposed through the upper side of the lens hole 161*a* while overlapping each other.

If the lever 139 is moved in another direction (e.g., a leftward direction with respect to a point at which the aperture coil 172 is disposed in the illustrated drawing) through the motion of the support 174, the first wing part 130_1 and the second wing part 130_2 may be moved in a direction in which the overlapping area decreases as in a second state (e.g., state 602, a state in which the first upper hole 137*a*2 of the first wing 134*a* and the second upper hole 137*b*2 of the second wing 134*b* completely overlap each other) illustrated in FIG. 6B. Accordingly, the first upper hole 137*a*2 provided in the first wing 134*a* and the second upper hole 137*b*2 provided in the second wing 134*b* may be exposed through the upper side of the lens hole 161*a* while overlapping each other.

As described above, the camera module 100 according to an embodiment of the present disclosure may adjust an area in which the lens hole 161*a* of the upper surface of the lens barrel 160 is exposed, by using the variable aperture 130 disposed on the lens barrel 160. According to an embodiment, the variable aperture 130 may be in a state of FIG. 6A in a photographing function (e.g., a pan-focusing function) that requires a relatively large amount of light, and the variable aperture 130 may be in a state of FIG. 6B in a photographing function (e.g., an out-focus function) that requires a relatively small amount of light.

Figure 7A:
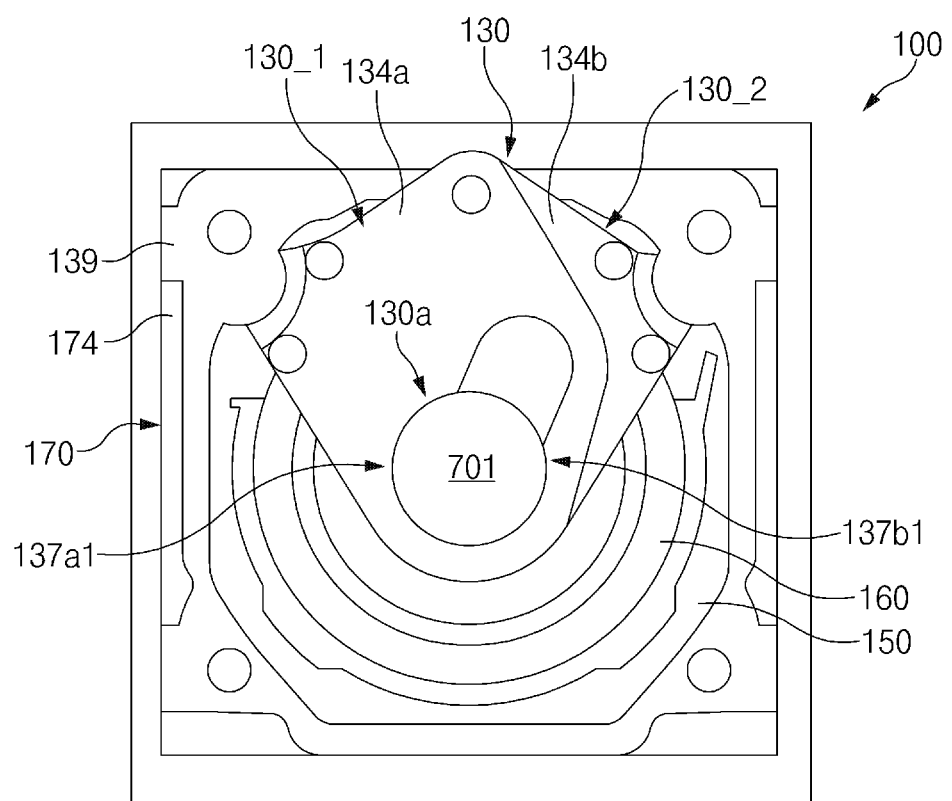
FIG. 7A is a view illustrating various examples of a first adjustment state of an aperture hole area of a variable aperture according to an embodiment of the present disclosure.

FIG. 7A is a view illustrating various examples of a first adjustment state of an aperture hole area of a variable aperture according to an embodiment of the present disclosure.

Figure 7B:
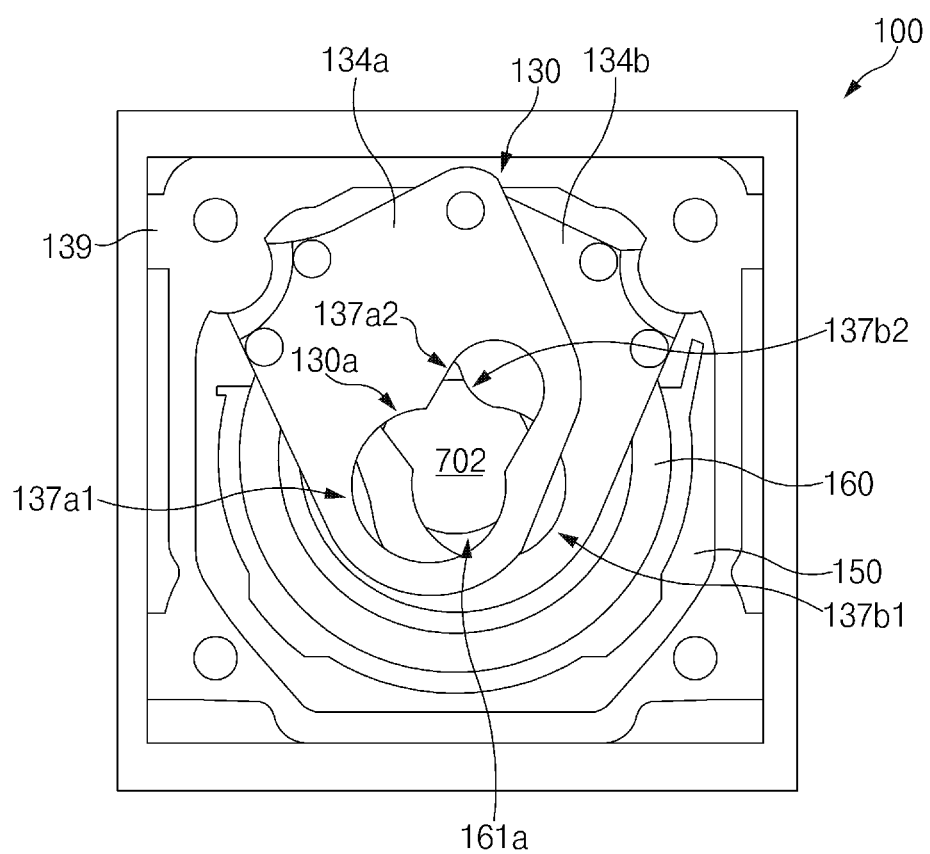
FIG. 7B is a view illustrating various examples of a second adjustment state of an aperture hole area of a variable aperture according to an embodiment of the present disclosure.

FIG. 7B is a view illustrating various examples of a second adjustment state of an aperture hole area of a variable aperture according to an embodiment of the present disclosure.

Figure 7C:
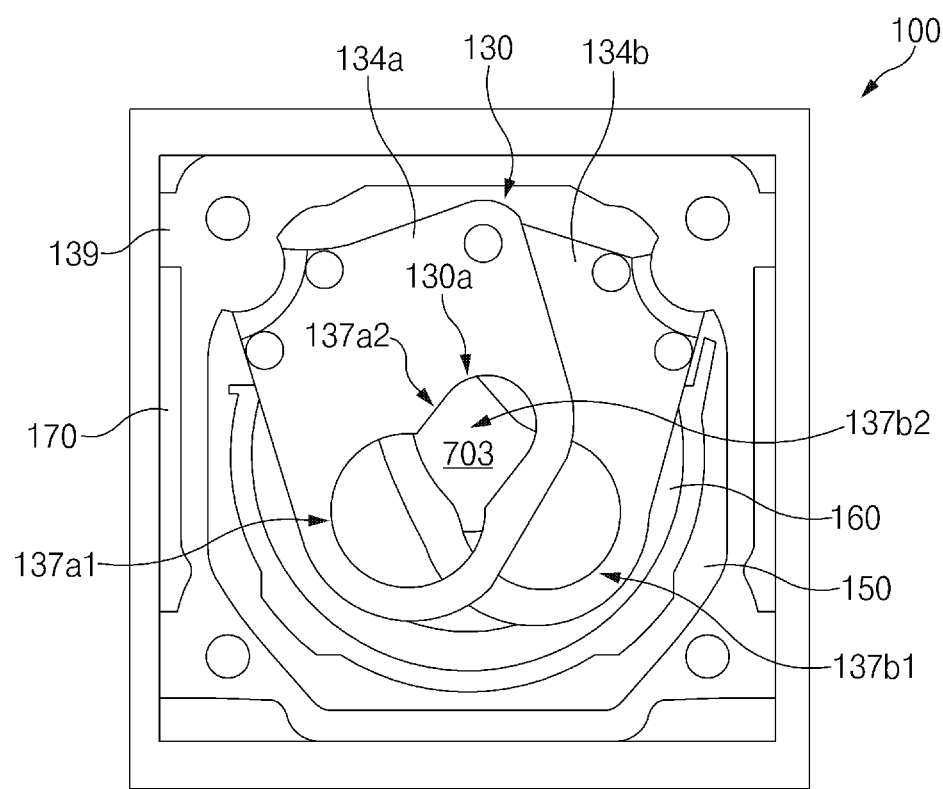
FIG. 7C is a view illustrating various examples of a third adjustment state of an aperture hole area of a variable aperture according to an embodiment of the present disclosure.

FIG. 7C is a view illustrating various examples of a third adjustment state of an aperture hole area of a variable aperture according to an embodiment of the present disclosure.

Figure 7D:
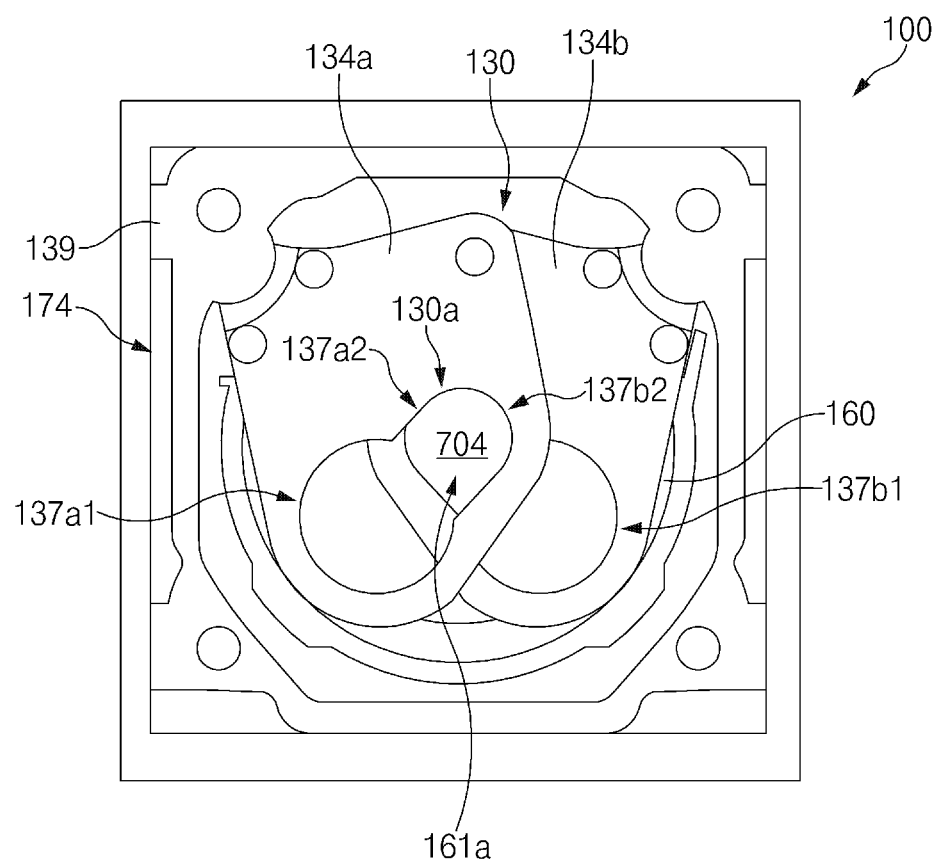
FIG. 7D is a view illustrating various examples of a fourth adjustment state of an aperture hole area of a variable aperture according to an embodiment of the present disclosure.

FIG. 7D is a view illustrating various examples of a fourth adjustment state of an aperture hole area of a variable aperture according to an embodiment of the present disclosure.

Referring to FIG. 7A, the camera module 100 according to an embodiment of the present disclosure, a first adjustment state 701 (e.g., a large aperture hole area) of the aperture hole area 130*a* may be formed as the first lower hole 137*a*1 of the first wing 134*a* and the second lower hole 137*b*1 of the second wing 134*b* overlap each other. In this regard, the aperture driving module 170 may operate the lever 139 disposed in the first wing part 130_1 such that the first wing 134a and the second wing 134b may move from the outside to the inside of a longitudinal center line of the camera module 100 with respect to the longitudinal center line. While the above-described aperture hole area 130a is in the first adjustment state 701, the lever 139 may be moved downwards with respect to the illustrated drawing and may be moved by a maximally movable distance. Additionally, the lever 139 may be stopped not to move further downwards, by the aperture fixing unit 140. According to various embodiments, the support 174 of the aperture driving module 170 for moving the lever 139 may be designed to limit a first direction maximum movement distance (e.g., a maximum movement distance for the first adjustment state 701).

Referring to FIG. 7B, the camera module 100 according to an embodiment of the present disclosure may form a second adjustment state 702 of the aperture hole area 130a (e.g., a star type aperture hole area) as a first size area of the first lower hole 137a1 of the first wing 134a and the second lower hole 137b1 of the second wing 134b, a second size area of the second upper hole 137b2, a third size area of the first upper hole 137a2 and the second lower hole 137b1 of second wing 134b, and third size areas of the second upper hole 137b2 overlap each other. In this regard, the aperture driving module 170 may operate the lever 139 disposed in the first wing part 130_1 such that the first wing 134a and the second wing 134b may move from a longitudinal center line of the camera module 100 outwards by a first angle with respect to the longitudinal center line. The second adjustment state 702 of the above-described aperture hole area 130a may be a state in which the lens hole 161a is partially covered by the variable aperture 130. The second adjustment state 702, for example, may be a state that is undergone when the state is changed from the first adjustment state 701 to a fourth adjustment state 704 described in FIG. 7D. Further, as a specific photographing function is executed, the variable aperture 130 may be temporarily fixed in the second adjustment state 702.

Referring to FIG. 7C, the camera module 100 according to an embodiment of the present disclosure may form a third adjustment state 703 of the aperture hole area 130a (e.g., a diamond type aperture hole area) as a fourth size area of the first lower hole 137a1 of the first wing 134a and the second lower hole 137b1 of the second wing 134b overlap each other, and a sixth size area of the first upper hole 137a2 of the first wing 134a and the second lower hole 137b1 of the second wing 134b and a seventh area of the second upper hole 137b2 overlap each other. In this regard, the aperture driving module 170 may operate the lever 139 disposed in the first wing part 130_1 such that the first wing 134a and the second wing 134b may move from a longitudinal center line of the camera module 100 outwards by a second angle (e.g., a specific angle that is larger than the first angle) with respect to the longitudinal center line. The third adjustment state 703 of the above-described aperture hole area 130a may be a state in which the lens hole 161a is covered by the variable aperture 130 more. The third adjustment state 703, for example, may be one of states that are undergone when the state is changed from the first adjustment state 701 to a fourth adjustment state 704 described in FIG. 7D. Further, as a specific photographing function is executed, the variable aperture 130 may be temporarily fixed in the second adjustment state 703.

Referring to FIG. 7D, the camera module 100 according to an embodiment of the present disclosure, a fourth adjustment state 704 (e.g., an aperture hole area having an elliptical shape or an egg shape) of the aperture hole area 130a may be formed as the first upper hole 137a2 of the first wing 134a and the second upper hole 137b2 of the second wing 134b overlap each other. In this regard, the aperture driving module 170 may operate the lever 139 disposed in the first wing part 130_1 such that the first wing 134a and the second wing 134b may move from a longitudinal center line of the camera module 100 outwards by a third angle (a maximum angle that may be widened by a specific angle or outwards as compared with the second angle) with respect to the longitudinal center line. The fourth adjustment state 704 of the above-described aperture hole area 130a may be a state in which the lens hole 161a is covered by the variable aperture 130 more than in the third adjustment state. The fourth adjustment state 704 may be temporarily fixed as a specific photographing function is executed.

According to various embodiments, the above-described second adjustment state 702, for example, may be a state in which the support 174 for operating the lever 139 is moved from the first adjustment state 701 in a first direction by a second distance (e.g., 0.4 mm, which may vary according to the size of the camera module 100 or the like). The above-described third adjustment state 703, for example, may be a state in which the support 174 for operating the lever 139 is moved from the first adjustment state 701 in the first direction by a third distance (e.g., 0.6 mm, which may vary according to the size of the camera module 100 or the like). The above-described fourth adjustment state 704, for example, may be a state in which the support 174 for operating the lever 139 is moved from the first adjustment state 701 in the first direction by a fourth distance (e.g., 0.7 mm, which may vary according to the size of the camera module 100 or the like).

Figure 8:
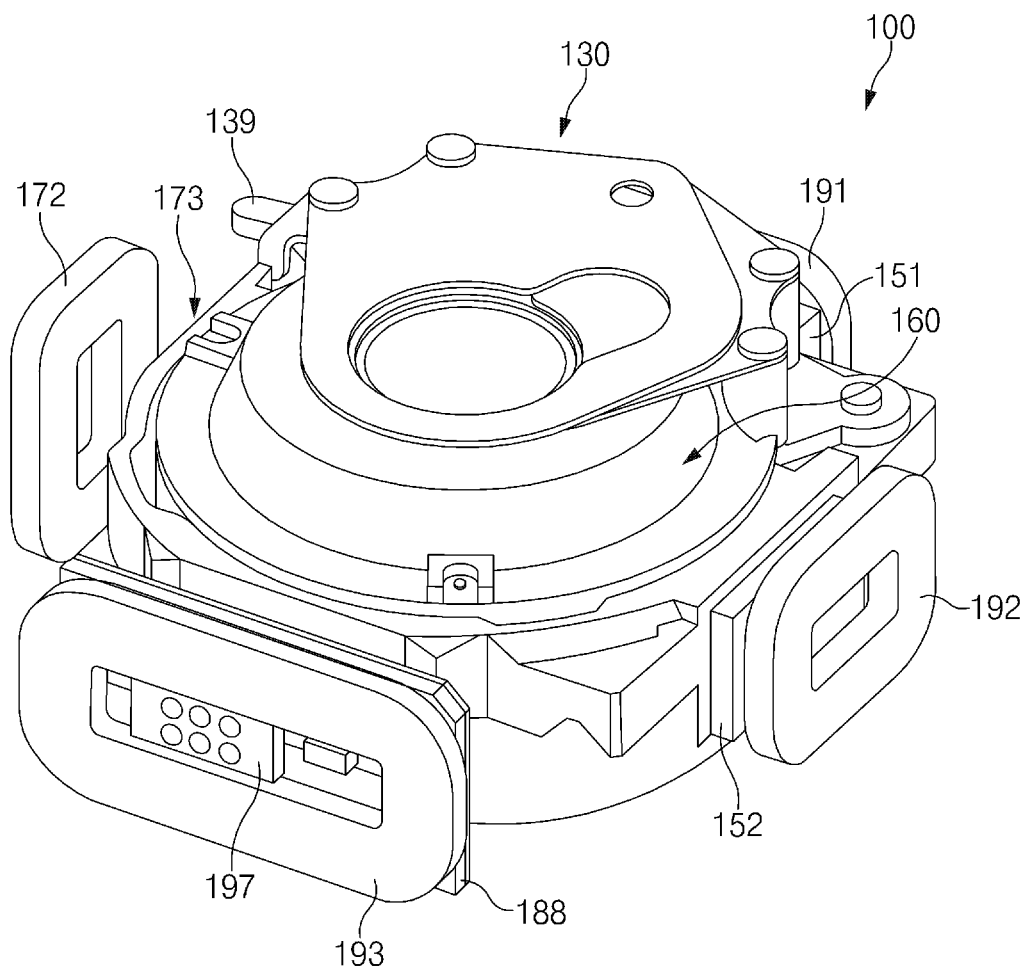
FIG. 8 is a view illustrating an example of a camera module related to movement of some configurations including a lens barrel according to an embodiment of the present disclosure.

FIG. 8 is a view illustrating an example of a camera module related to movement of some configurations including a lens barrel according to an embodiment of the present disclosure.

Referring to FIG. 8, the camera module 100, for example, may include a second movable carrier 180 in which some configurations related to the lens barrel 160 are seated, and a third magnet member 188 and a third coil 193 (e.g., an auto-focusing related coil) configured to move the second movable carrier 180 including the lens barrel 160 in an upward/downward direction (or the Z-axis direction) and a focusing driving IC 197 may be included in the housing 190 in which the second movable carrier 180 is seated. For example, the third magnet member 188 may be fixed to one side of the second movable carrier 180, and the third coil 193 and the focusing driving IC 197 may be disposed on one side of the housing 190, at least a portion of which faces the third magnet member 188. Accordingly, if electric power is supplied to the third coil 193, the third magnet member 188 may interact with the third coil 193 to move the second movable carrier 180 upwards and downwards.

Additionally, a fourth magnet member 173 related to driving of the lever 139 of the variable aperture 130 may be disposed on one side of the second movable carrier 180 of the camera module 100, and the aperture coil 172 that interacts with the fourth magnet member 173, the aperture driving IC, and the like may be disposed in the housing 190 and the like. According to various embodiments, in the camera module 100, the first magnet member 151 and the second magnet member 152 may be disposed on one side of the first movable carrier 150 such that some configurations including the lens barrel 160 may be moved on a horizontal plane, and a first coil 191, a second coil 192, a driving IC related to driving of the first coil 191 and the second coil 192, and the like may be disposed in the housing 190.

Figure 9A:
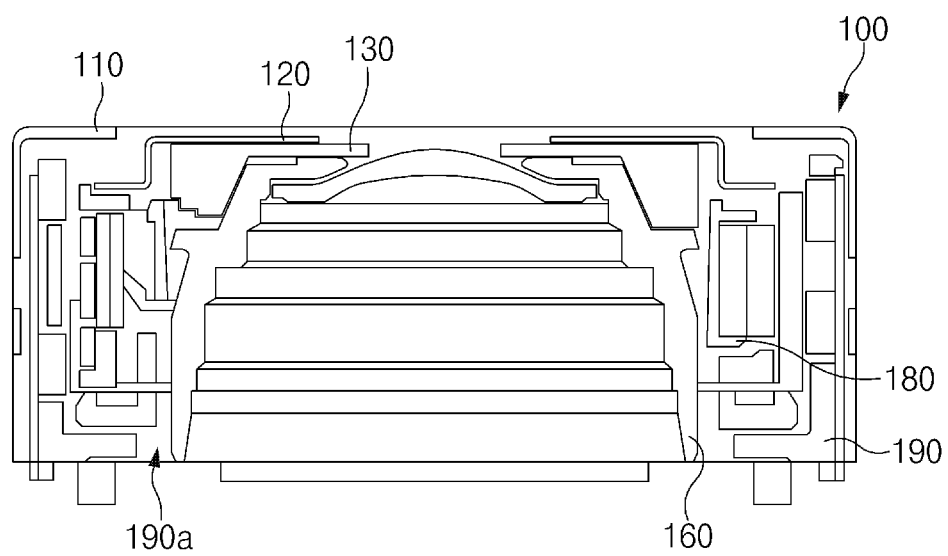
FIG. 9A is a view illustrating a first state of a Z-axis movement of a camera module according to an embodiment of the present disclosure.

FIG. 9A is a view illustrating a first state of a Z-axis movement of a camera module according to an embodiment of the present disclosure.

Figure 9B:
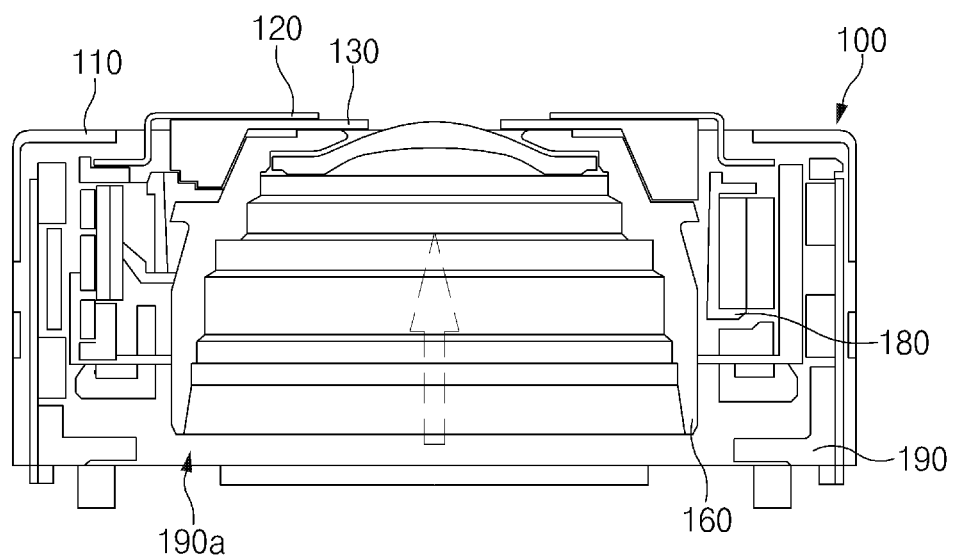
FIG. 9B is a view illustrating a second state of a Z-axis movement of a camera module according to an embodiment of the present disclosure.

FIG. 9B is a view illustrating a second state of a Z-axis movement of a camera module according to an embodiment of the present disclosure.

Referring to FIG. 9A, in the camera module 100, some configurations (e.g., the second movable carrier 180) including the lens barrel 160 may be seated on the bottom of the housing 190. In a state in which the lens barrel 160 is seated in the housing 190, the variable aperture 130 positioned on the lens barrel 160 may be located below the upper surface of the shield can 110. Accordingly, the stopper 120 positioned on the upper side of the variable aperture 130 may be disposed at a height that is substantially similar to the height of the upper surface of the shield can 110. Further, at least a portion (e.g., a portion of a lower end of the lens barrel 160) of the lens barrel 160 may be located in the seating part hole 190a disposed at the center of the bottom of the housing 190.

Referring to FIG. 9B, in the camera module 100, some configurations (e.g., the second movable carrier 180) including the lens barrel 160 may be located at a specific height from the bottom of the housing 190. In a state (or coming-over state) in which the lens barrel 160 is spaced apart from the bottom of the housing 190 by a specific height, the variable aperture 130 positioned on the lens barrel 160 may be disposed at a height (e.g., a state in which the variable aperture is parallel to the upper surface of the shield can 100) that is substantially similar to the upper surface of the shield can 110. Accordingly, the stopper 120 positioned on the variable aperture 130 is disposed at a height that is higher than the upper surface of the shield can 110 so that the stopper 120 protrudes further than the outer surface of the shield can 110 when viewed from the outside. Further, a lower end of the lens barrel 160 may be disposed at a height that is higher than the height of the seating part hole 190a disposed at a central portion of the housing 190.

According to various embodiments, in relation to the performance of the auto-focusing function of the camera module 100, the lens barrel 160 may move toward the bottom of the housing 190 or in a direction in which the lens barrel 160 becomes far away from the bottom of the housing 190. According to various embodiments, if an auto-focusing function or a zoom-out function of the camera module 100 is executed, a control unit of the camera module 100 or the electronic device, on which the camera module 100 is mounted, may adjust a supply direction of electric current to the third coil 193 such that some configurations including the lens barrel 160 may become closer to or contact the bottom of the housing 190. According to various embodiments, if an auto-focusing function or a zoom-in function of the camera module 100 is executed, a control unit of the camera module 100 or the electronic device, on which the camera module 100 is mounted, may adjust a supply direction of electric current to the third coil 193 such that some configurations including the lens barrel 160 may be spaced apart from the bottom of the housing 190 by a specific height. Then, the direction of the current supplied to the third coil 193 may be different from a direction of the current supplied to the third coil 193 described in FIG. 9A.

Figure 10:
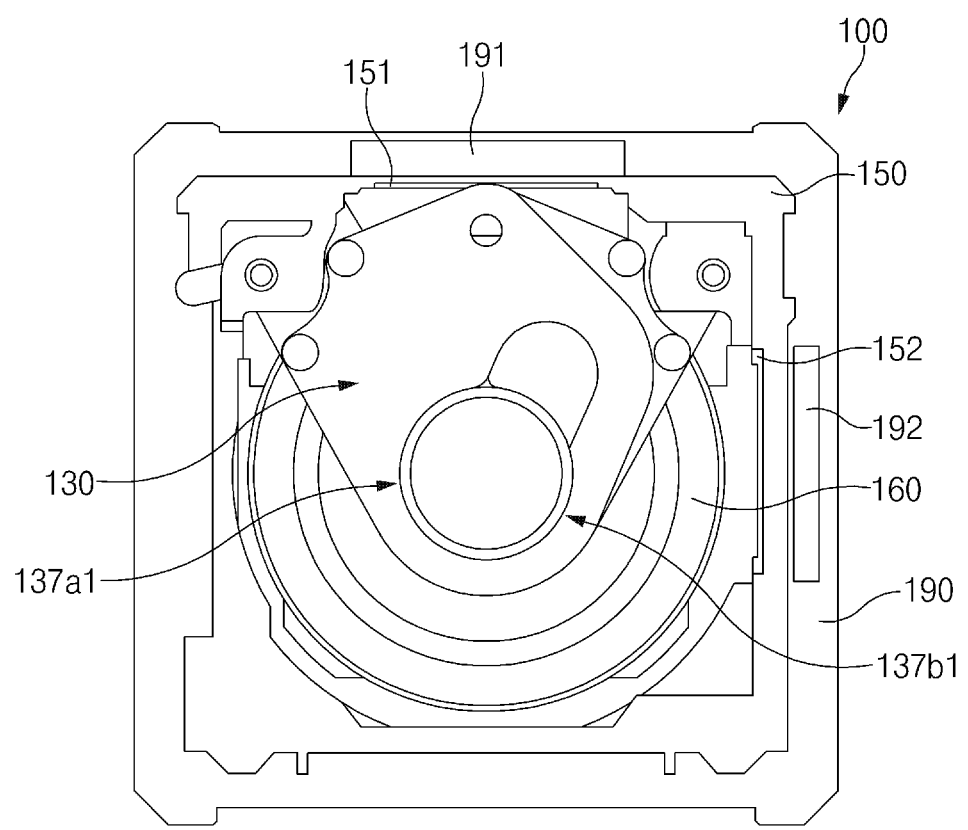
FIG. 10 is a view illustrating an example of a hand shaking compensation related configuration of a camera module according to an embodiment of the present disclosure.

FIG. 10 is a view illustrating an example of a hand shaking compensation related configuration of a camera module according to an embodiment of the present disclosure.

Referring to FIG. 10, the camera module 100 may include a first coil 191 disposed to prevent hand-shaking of some configurations including the lens barrel 160 in the X-axis direction, and a second coil 192 disposed to prevent hand-shaking of some configurations including the lens barrel 160 in the Y-axis direction. The first coil 191 and the second coil 192 may be disposed on one side of the housing 190, and may be disposed on an inner wall that may face an outer wall of the first movable carrier 150. The first magnet member 151 may be disposed in an area of one side of the first movable carrier 150, which faces the first coil 191. The second magnet member 152 may be disposed in an area of one side of the first movable carrier 150, which faces the second coil 192.

The variable aperture 130 may be disposed on the lens barrel 160. Although it has been exemplified, for example, that the variable aperture 130 is in a first adjustment state 701 in which the first lower hole 137a1 and the second lower hole 137b1, which have been described in FIGS. 7A to 7D, overlap each other, the present disclosure is not limited thereto. For example, the variable aperture 130 may be in any one state of the second adjustment state 702, the third adjustment state 703, and the fourth adjustment state 704, which have been described in FIGS. 7B to 7D, according to user setting or the like related to the camera module 100. The variable aperture 130 may be supported by one side of the lens barrel 160, and may have the same motion as the lens barrel 160 as being seated on the first movable carrier 150 while the camera module 100 moves (e.g., in the X-axis direction or the Y-axis direction) on the horizontal plane related to compensation of hand-shaking.

Figure 11A:
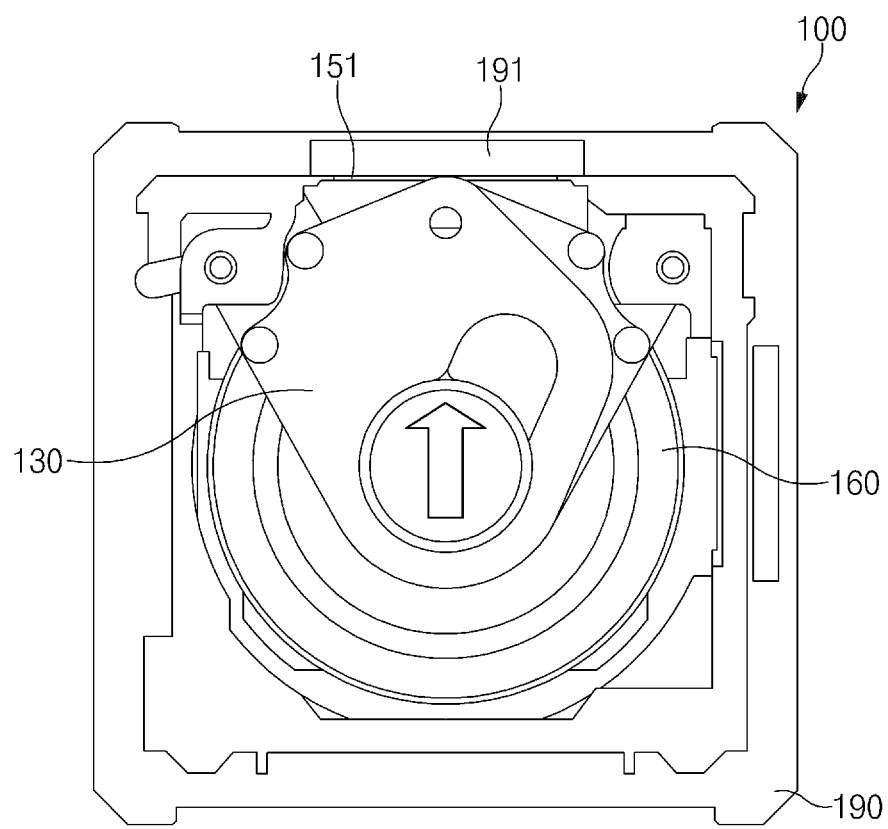
FIG. 11A is a view illustrating an example of X-axis movement of a lens barrel of a camera module according to an embodiment of the present disclosure.

FIG. 11A is a view illustrating an example of X-axis movement of a lens barrel of a camera module according to an embodiment of the present disclosure.

Figure 11B:
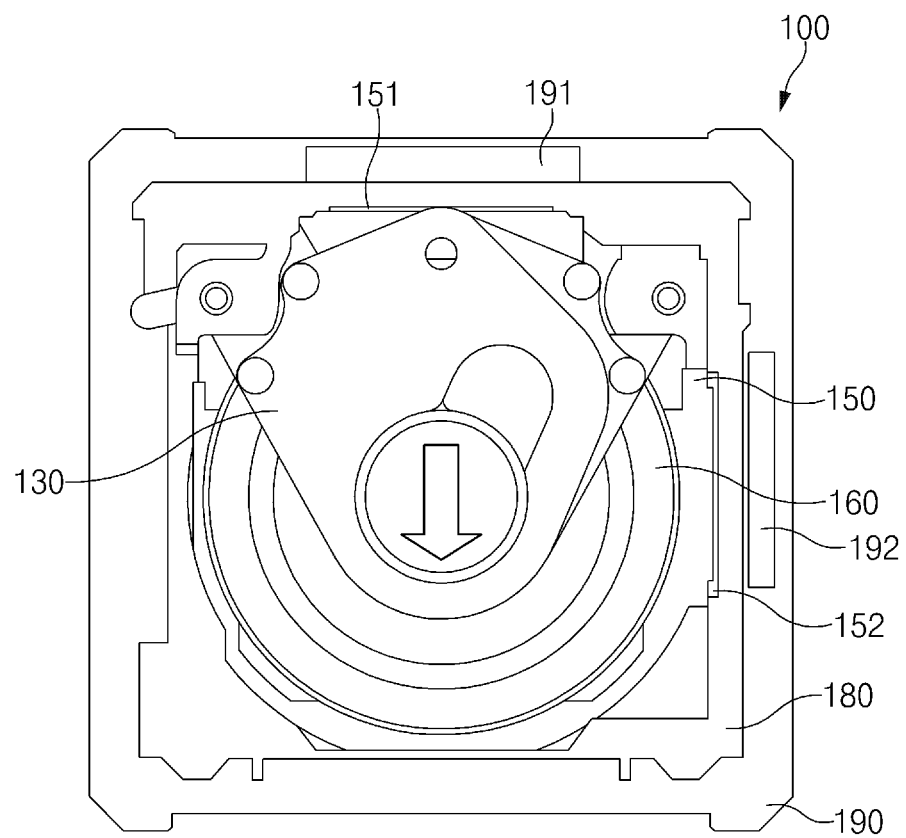
FIG. 11B is a view illustrating another example of X-axis movement of a lens barrel of a camera module according to an embodiment of the present disclosure.

FIG. 11B is a view illustrating another example of X-axis movement of a lens barrel of a camera module according to an embodiment of the present disclosure.

Referring to FIG. 11A, according to an embodiment of the present disclosure, some configurations (e.g., the lens barrel 160, the variable aperture 130, the first movable carrier 150, and the second movable carrier 180) of the camera module 100, including the lens barrel 160, may move in the first direction through an interaction of the first coil 191 and the first magnet member 151. The first direction, for example, may be a forward direction with reference to the illustrated drawing. According to an embodiment, the first coil 191 and the first magnet member 151 may be polarized or supplied with electric power such that an attractive force may generated between them. In this case, while the first movable carrier 150 including the first magnet member 151 is moved toward the housing 190, in which the first coil 191 is disposed, the lens barrel 160 may be moved in a forward direction. According to an embodiment, the lens barrel 160 may be moved in a forward direction by 0.2 mm. The movement distance of the lens barrel 160 may vary according to the size of the camera module 100 or the like.

Referring to FIG. 11B, according to an embodiment of the present disclosure, some configurations (e.g., the lens barrel 160, the variable aperture 130, the first movable carrier 150, and the second movable carrier 180) of the camera module 100, including the lens barrel 160, may move in the second direction through an interaction of the first coil 191 and the first magnet member 151. The second direction, for example, may be a rearward direction with reference to the illustrated drawing. According to an embodiment, the first coil 191 and the first magnet member 151 may be polarized or supplied with electric power such that a repulsive force may generated between them. In this case, while the first movable carrier 150 including the first magnet member 151 is moved in a direction that is opposite to the housing 190, in which the first coil 191 is disposed, the lens barrel 160 may be moved in a forward direction. According to an embodiment, the lens barrel 160 may be moved in a rearward direction by 0.2 mm. The movement distance of the lens barrel 160 may vary according to the size of the camera module 100 or the like. According to an embodiment, the second direction may include a direction that is opposite to the first direction.

Figure 12A:
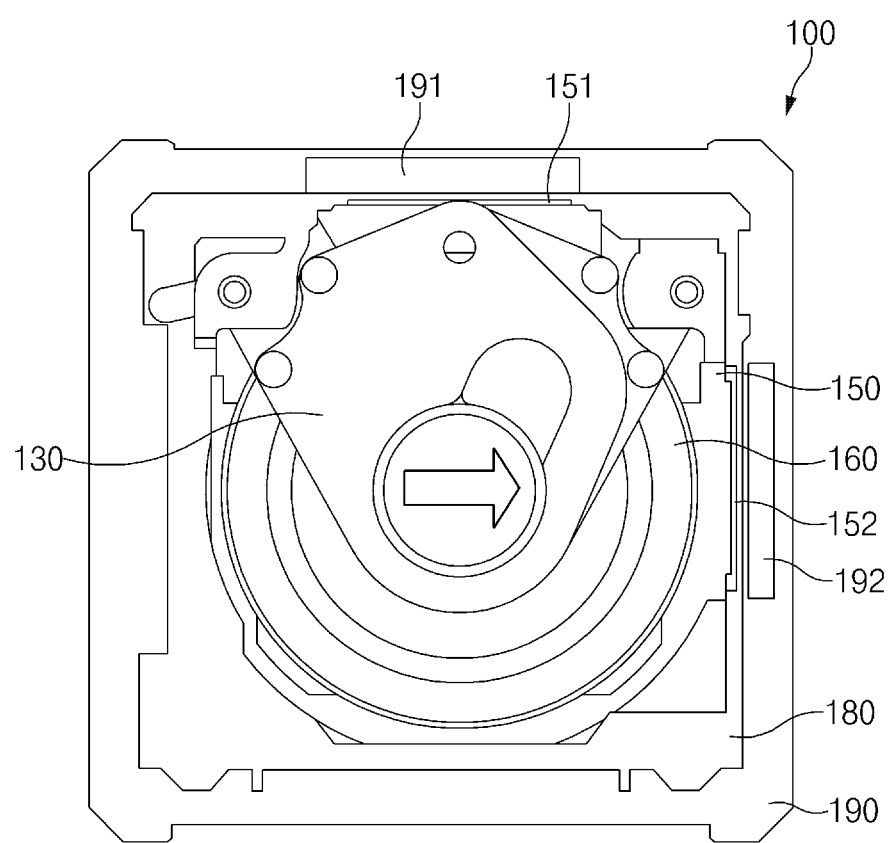
FIG. 12A is a view illustrating an example of Y-axis movement of a lens barrel of a camera module according to an embodiment of the present disclosure.

FIG. 12A is a view illustrating an example of Y-axis movement of a lens barrel of a camera module according to an embodiment of the present disclosure.

Figure 12B:
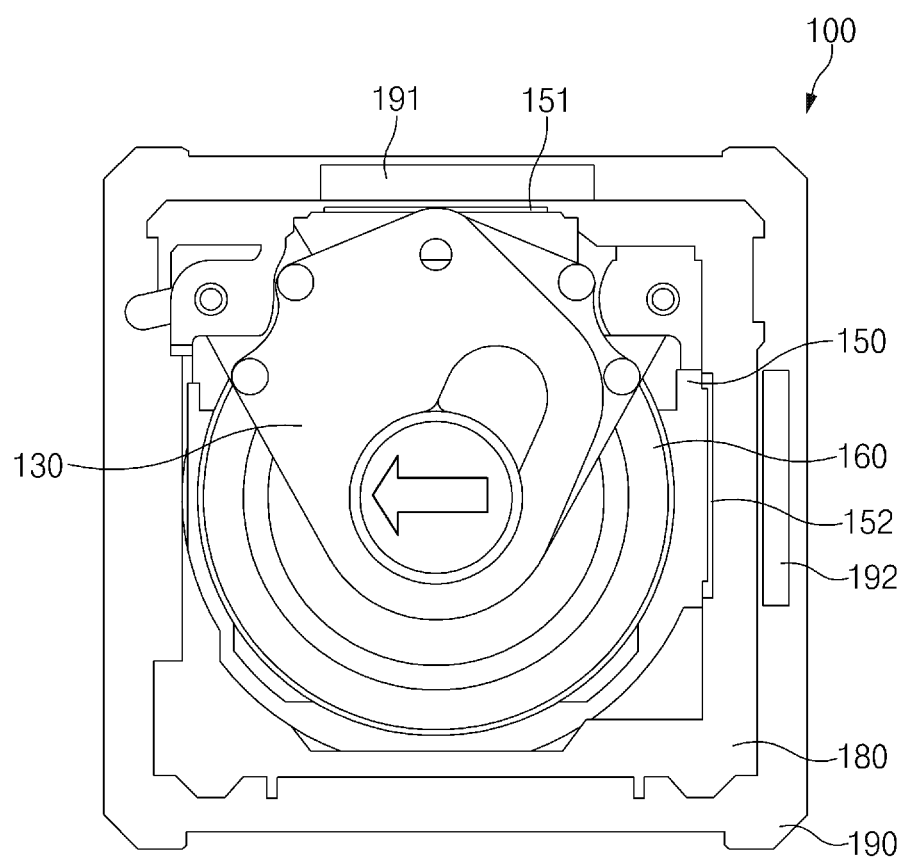
FIG. 12B is a view illustrating another example of Y-axis movement of a lens barrel of a camera module according to an embodiment of the present disclosure.

FIG. 12B is a view illustrating another example of Y-axis movement of a lens barrel of a camera module according to an embodiment of the present disclosure.

Referring to FIG. 12A, according to an embodiment of the present disclosure, some configurations (e.g., the lens barrel 160, the variable aperture 130, the first movable carrier 150, and the second movable carrier 180) of the camera module 100, including the lens barrel 160, may move in the third direction through an interaction of the second coil 192 and the second magnet member 152. The third direction, for example, may be a rightward direction with reference to the illustrated drawing. According to an embodiment, the second coil 192 and the second magnet member 152 may be polarized or supplied with electric power such that an attractive force may generated between them. In this case, while the first movable carrier 150 including the second magnet member 152 is moved toward the housing 190, in which the second coil 192 is disposed, the lens barrel 160 may be moved in a rightward direction. According to an embodiment, the lens barrel 160 may be moved in a rightward direction by 0.2 mm. The movement distance of the lens barrel 160 may vary according to the size of the camera module 100 or the like.

Referring to FIG. 12B, according to an embodiment of the present disclosure, some configurations (e.g., the lens barrel 160, the variable aperture 130, the first movable carrier 150, and the second movable carrier 180) of the camera module 100, including the lens barrel 160, may move in the fourth direction through an interaction of the second coil 192 and the second magnet member 152. The fourth direction, for example, may be a leftward direction with reference to the illustrated drawing. According to an embodiment, the first coil 191 and the first magnet member 151 may be polarized or supplied with electric power such that a repulsive force may generated between them. In this case, while the first movable carrier 150 including the first magnet member 151 is moved in a direction that is opposite to the housing 190, in which the second coil 192 is disposed, the lens barrel 160 may be moved in a leftward direction. According to an embodiment, the lens barrel 160 may be moved in a leftward direction by 0.2 mm. The movement distance of the lens barrel 160 may vary according to the size of the camera module 100 or the like.

The above-described camera module 100 may maintain a state in which the lens barrel 160 and the lens hole 161*a* are aligned with each other independently from the performance of OIS (compensation of hand-shaking) as the variable aperture 130 is fixed to the upper side of the lens barrel 160 even during the performance of the motion related to the OIS.

According to various embodiments, a camera module (or a camera device, or a camera apparatus) may include a lens barrel including at least one lens and a lens hole, and a variable aperture including an aperture hole area which is arranged on the lens hole formed in the lens barrel, wherein a size of the aperture hole area is adjustable.

According to various embodiments, the variable aperture may include a plurality of wing parts, and wherein the plurality of wing parts is configured to move while partially overlapping each other.

According to various embodiments, at least one wing part may include a wing and a wing hole disposed in the wing and forming the aperture hole area while the size of an overlapping area is changed as the at least two wing parts are moved.

According to various embodiments, at least one wing part may include a wing support configured to support the wing, a wing holder extending from the wing support, and a lever protruding from one side of the wing holder.

According to various embodiments, the camera module may further include an aperture driving module (or aperture driving device) configured to adjust movement of the wing part by moving the lever in a specific direction.

According to various embodiments, the aperture driving module may include a support in which the lever is inserted into one side thereof, a magnet member disposed on one side of the support, a coil configured to interact with the magnet member to move the support in a specific direction, and an aperture driving IC configured to control supply of electric power to the coil.

According to various embodiments, at least one wing part may include a connection boss formed on one side of a wing of the at least two wing parts and configured to function as an axis such that the wing part moves in one direction while being engaged with another wing part of the at least two wing parts, or a connection hole formed on one side of the wing, into which the connection boss is inserted, and configured to move along an inner peripheral surface of the connection boss.

According to various embodiments, the camera module may further include a first movable carrier, on which the lens barrel is seated, an aperture fixing unit configured to fix the variable aperture on the first movable carrier, a stopper disposed on the variable aperture and configured to prevent deviation of the variable aperture, a housing, on which the lens barrel and the variable aperture are seated, and a shield covering the lens barrel and the variable aperture.

According to various embodiments, the camera module may further include at least one magnet member disposed on one side of the first movable carrier and involving in horizontal movement of the first movable carrier, a coil configured to interact with the at least one magnet member to move the first movable carrier in a specific direction, and a driving IC configured to control supply of electric power to the coil.

According to various embodiments, the variable aperture may include a first wing part including a first wing hole of a specific size and configured to move in a specific angle range, and a second wing part including a second wing hole of a specific size, which forms an aperture hole area, at least a portion of which is aligned with the lens hole while at least partially overlapping the first wing hole and configured to move in a specific angle range.

According to various embodiments, the first wing hole and the second wing hole may be formed as a plurality of holes of different diameters partially overlapping each other.

According to various embodiments, the variable aperture may be disposed on the lens barrel, and wherein the camera module may further include a second movable carrier, on which the lens barrel is seated, and a magnet member disposed on one side of the second movable carrier, disposed to face a coil of a specific location, and related to upward and downward movement of the second movable carrier.

According to various embodiments, the lens barrel may further include an aperture holder protruding from an outer wall of the lens barrel and supporting one side of the variable aperture.

According to various embodiments, an upper end of an uppermost lens of the lens barrel is higher than a periphery of the aperture hole area of the variable aperture.

Figure 13:
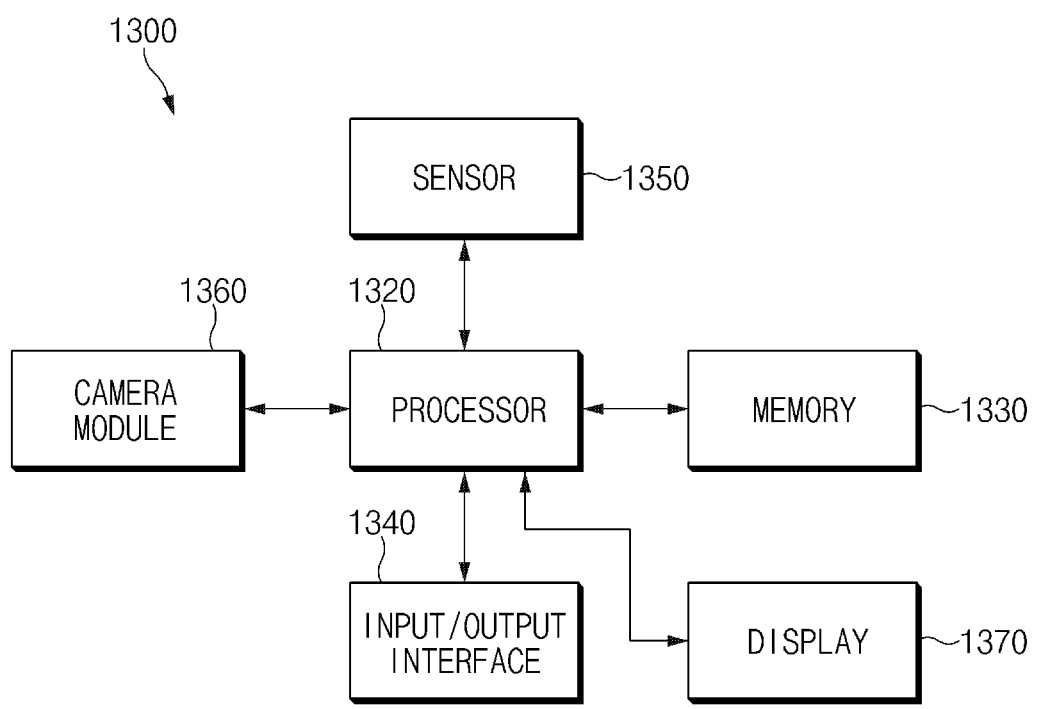
FIG. 13 is a view illustrating an example of a configuration of an electronic device including a camera module according to an embodiment of the present disclosure.

FIG. 13 is a view illustrating an example of a configuration of an electronic device including a camera module according to an embodiment of the present disclosure.

Referring to FIG. 13, the electronic device 1300 according to an embodiment of the present disclosure may include a processor 1320, a memory 1330, an input/output interface 1340, a sensor 1350, a camera module 1360 (e.g., the camera module 100), and the display 1370. The electronic device 1300 may include a printed circuit board, in which the processor 1320, the memory 1330, and the sensor 1350 are seated, and a case for protecting the printed circuit board and the display 1370. A hole may be formed on one side of the case such that the camera module 1360 may be disposed in the hole. Accordingly, one surface (e.g., a surface on which a lens hole is disposed) of the camera module 1360 may be exposed to the outside through the hole formed on one side of the case. A cover (e.g., a glass cover) related to protection of the camera module 1360 may be disposed in the hole formed in the case.

According to an embodiment of the present disclosure, the processor 1320 may deliver a control signal related to driving of the camera module 1360 to the camera module 1360, and may output an image captured by the camera module 1360 through the display 1370 or store the image in the memory 1330. According to an embodiment, the processor 1320 may output a user interface (UI) related to selection of a photographing function using the camera module 1360 through the display 1370. For example, the processor 1320 may output a menu screen or an icon including a pan-focusing function selection item and an out-focus function selection item on the display 1370. The processor 1320 may deliver a first control signal corresponding to selection of the pan-focusing function or a second control signal corresponding to selection of the out-focus function to the camera module 1360.

According to various embodiments, the processor 1320 may deliver a control signal related to the first adjustment state 710 or a second control signal related to the fourth adjustment state 704 to the camera module 1360 based on sensor information collected by the sensor 1350. For example, the processor 1320 may identify whether the intensity of illumination of the outside is a specific illumination intensity or lower, based on the illumination intensity information provided by the sensor 1350. When the intensity of illumination of the outside is the specific illumination intensity or lower, the processor 1320 may deliver the first control signal to the camera module 1360. Further, when the intensity of illumination of the outside exceeds the specific illumination intensity, the processor 1320 may deliver the second control signal to the camera module 1360.

The memory 1330 may store a program or data related to management of the electronic device 1300. The memory 1330 may store an image (e.g., a preview image, a still image, or a video) collected by the camera module 1360. According to an embodiment, the memory 1330 may store an application related to management of the camera module 1360. Further, the memory 1330 may store an instruction to transmit a first control signal or a second control signal to the camera module 1360 in correspondence to a user input that is input from the input/output interface 1340. Further, the memory 1330 may store an instruction to transmit a first control signal or a second control signal to the camera module 1360 based on the sensor information collected by the sensor 1350.

The input/output interface 1340 may include at least one input unit that may generate an input signal corresponding to a user input of the electronic device 1300. For example, the input/output interface 1340 may receive a user input that may select the first adjustment state 701 or the fourth adjustment state 704 of the camera module 1360. According to an embodiment, the input/output interface 1340 may include an audio device, and may output audio information corresponding to a current adjustment state of the variable aperture 130 of the camera module 1360. For example, if an input signal related to a request of activation of the camera module 1360 is generated, the audio device may output audio information corresponding to a current adjustment state of the camera module 1360. Further, if the adjustment state of the camera module 1360 is changed, the audio device may output audio information corresponding to the changed adjustment state.

The sensor 1350 may include at least one sensor related to management of the electronic device 1300. For example, the sensor 1350 may include an illumination sensor that may measure the intensity of illumination of the outside. When the camera module 1360 is activated, the sensor 1350 may collect sensor information on the intensity of illumination, and may deliver the collected sensor information to the processor 1320. Although it has been exemplified in the illustrated description that the sensor 1350 is connected to the processor 1320, the present disclosure is not limited thereto. For example, the sensor 1350 may be directly connected to the camera module 1360. In this case, an image sensor IC included in the camera module 1360 may change management of the sensor 1350 and the adjustment state according to the management of the sensor 1350 (e.g., change the state of the variable aperture 130 to the first adjustment state 701 or change the variable aperture 130 to the second adjustment state 702 in correspondence to the illumination intensity information).

The display 1370 may include at least one screen related to management of the electronic device 1300. According to an embodiment, the display 1370 may provide an icon or a menu related to activation or deactivation of the camera module 1360. The display 1370 may output a user input that may select the first adjustment state 701 or the fourth adjustment state 704 of the variable aperture 130 of the camera module 1360. Further, if the camera module 1360 is activated according to a request for activation of the camera module 1360, the display 1370 may output a text or an image corresponding to the adjustment state of the variable aperture 130.

According to various embodiments, an electronic device may include a case, a camera module, at least a portion of which is exposed through a hole formed in the case, and a processor electrically connected to the camera module (or camera device), wherein the camera module may include a lens barrel including at least one lens and a lens hole, a variable aperture including an aperture hole area which is arranged on the lens hole formed in the lens barrel, and a size of the aperture hole area being adjustable, and an aperture driving module configured to control adjustment of the size of the aperture hole area.

According to various embodiments, the processor may be configured to, if execution of a pan focusing function is requested, transmit a control signal to perform a control such that the variable aperture has an aperture hole area of the largest adjustable size.

According to various embodiments, the processor may be configured to, if execution of an out-focusing function is requested, transmit a control signal to perform a control such that the variable aperture has an aperture hole area of the smallest adjustable size.

According to various embodiments, the electronic device may further include a sensor configured to sense illumination intensity information, wherein the processor may be configured to determine an intensity of illumination of the outside based on the illumination intensity information, and when the intensity of illumination of the outside is a specific value or less, transmit a control signal to perform a control such that the aperture hole area has a hole area of a first size to the camera module.

According to various embodiments, the processor may be configured to, when the intensity of illumination of the outside exceeds a specific illumination intensity, transmit a control signal to perform a control such that the aperture hole area has a hole area of a second size that is smaller than the first size to the camera module.

According to various embodiments, the electronic device may further include a display configured to output state information corresponding to the size of the aperture hole area of the variable aperture.

Figure 14:
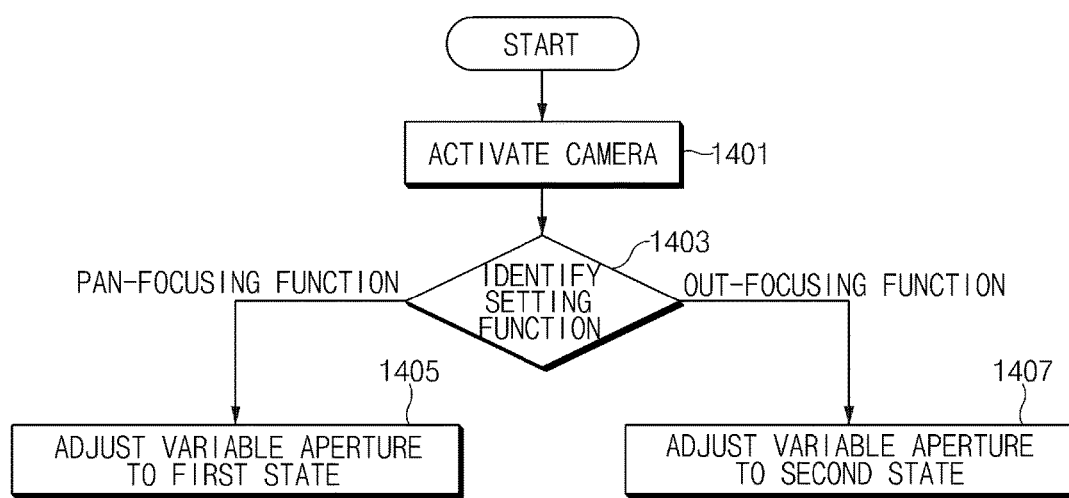
FIG. 14 is a view illustrating an example of a method for managing an electronic device including a camera module according to an embodiment of the present disclosure.

FIG. 14 is a view illustrating an example of a method for managing an electronic device including a camera module according to an embodiment of the present disclosure.

Referring to FIG. 14, in relation to the method for managing an electronic device according to an embodiment of the present disclosure, in operation 1401, the processor 1320 may activate a camera module. For example, the processor 1320 may provide an icon or a menu related to activation of the camera module or may provide a button related to activation of the camera module. If an input signal corresponding to an icon, the selection of a menu, or a button input is received, the processor 1320 may activate the camera module 1360 by supplying the camera module 1360 (e.g., the camera module 100) with electric power. Further, the processor 1320 may automatically activate the camera module 1360 if a request for execution of a function (e.g., manufacturing of a video) related to the camera module 1360 is made.

In operation 1430, the processor 1320 may identify a setting function. For example, the processor 1320 may identify whether an input signal related to change of an adjustment state of the variable aperture 130 is generated. Further, the processor 1320 may identify an adjustment state value of the variable aperture 130, which has been set to a default value. Further, the processor 1320 may identify illumination intensity information of the outside.

When execution of the pan-focusing function (or a function set to maintain the variable aperture 130 in the first adjustment state 701) in operation 1403, the processor 1320 may adjust the state of the variable aperture 130 to a first state (e.g., a state in which the first lower hole 137a1 of the first wing 134a and the second lower hole 137b1 of the second wing 134 overlap each other or the first adjustment state 701) in operation 1405.

When execution of the out-focusing function (or a function set to maintain the variable aperture 130 in the fourth adjustment state 704) in operation 1403, the processor 1320 may adjust the state of the variable aperture 130 to a second state (e.g., a state in which the first upper hole 137a2 of the first wing 134a and the second upper hole 137b2 of the second wing 134 overlap each other or the fourth adjustment state 704) in operation 1407.

According to various embodiments, if deactivation of the camera module 1360 is requested, the processor 1320 may deactivate the camera module 1360 after maintaining the state of the variable aperture 130 in a specific state (e.g., the first state or the second state). For example, when a pan-focusing function of the management function of the camera module 1360 is mainly used, the processor 1320 may deactivate the camera module 1360 after the state of the variable aperture 130 is changed to a first state if the state of the camera module 1360 shortly before the deactivation of the camera module 1360 is a second state. Further, when an out-focusing function of the management function of the camera module 1360 is mainly used, the processor 1320 may deactivate the camera module 1360 after the state of the variable aperture 130 is changed to the second state if the state of the camera module 1360 shortly before the deactivation of the camera module 1360 is the first state.

According to various embodiments, if deactivation of the camera module 1360 is requested, the processor 1320 may deactivate the camera module 1360 after maintaining the state of the variable aperture 130 in a specific state (e.g., the first state or the second state) according to the intensity of illumination shortly before the request for deactivation. For example, when the intensity of illumination shortly before the deactivation of the camera module 1360 is a specific illumination intensity or lower, the processor 1320 may deactivate the camera module 1360 after the state of the variable aperture 130 is changed to the first state or maintained. Further, when the intensity of illumination shortly before the deactivation of the camera module 1360 exceeds a specific illumination intensity, the processor 1320 may deactivate the camera module 1360 after the state of the variable aperture 130 is changed to the second state or maintained.

According to various embodiments, when deactivation of the camera module 1360 is requested, the processor 1320 may restore the adjustment state of the variable aperture 130 with reference to the initial state of the aperture coil 172 and the third magnet member 188. For example, if the initial state of the aperture coil 172 and the third magnet member 188 is designed to be a first state (e.g., a state in which the lever 139 is moved such that the first lower hole 138a1 and the second lower hole 137b1 overlap each other) when the electronic device 1300 is designed, the processor 1320 may deactivate the camera module 1360 after the variable aperture 130 is restored to the first state when the camera module 1360 is deactivated. For example, if the initial state of the aperture coil 172 and the third magnet member 188 is designed to be a second state (e.g., a state in which the lever 139 is moved such that the first upper hole 137a2 and the second upper hole 137b2 overlap each other) when the electronic device 1300 is designed, the processor 1320 may deactivate the camera module 1360 after the variable aperture 130 is restored to the second state when the camera module 1360 is deactivated.

According to various embodiments, the method for managing an electronic device according to an embodiment may include an operation of receiving a request for deactivation of a camera, and a variable aperture adjusting operation of adjusting or maintaining the size of an aperture hole area of a variable aperture disposed on a lens barrel according to a specific condition.

According to various embodiments, the variable aperture adjusting operation may include an operation of identifying illumination intensity information, and an operation of adjusting the aperture hole area to a first size (or a maximum size) when the intensity of illumination is a specific value or higher.

According to various embodiments, the variable aperture adjusting operation may include an operation of identifying illumination intensity information, and an operation of adjusting the aperture hole area to a second size (e.g., a size that is smaller than the first size or a minimum size) when the intensity of illumination is a specific value or higher.

According to various embodiments, the variable aperture adjusting operation may include an operation of identifying a set photographing function, and an operation of adjusting the aperture hole area to a first size (or a maximum size) when the set photographing function is a pan-focusing function.

According to various embodiments, the variable aperture adjusting operation may include an operation of identifying a set photographing function, and an operation of adjusting the aperture hole area to a second size (e.g., a size that is smaller than the first size or a minimum size) when the set photographing function is an out-focusing function.

Figure 15:
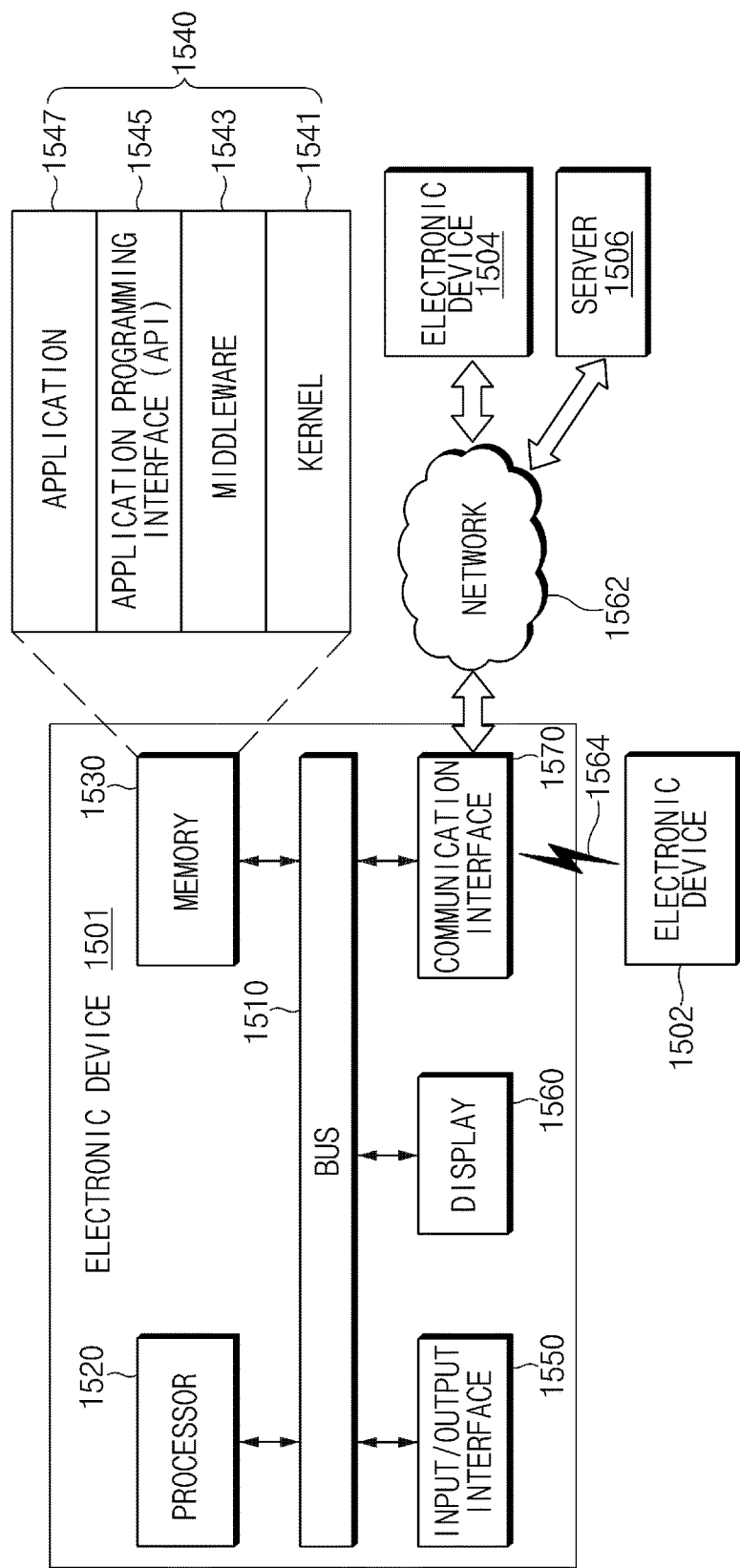
FIG. 15 is a view illustrating an example of an electronic device operating environment according to an embodiment of the present disclosure.

FIG. 15 is a block diagram illustrating a configuration of an electronic device in a network environment according to an embodiment of the present disclosure.

Referring to FIG. 15, in various embodiments, an electronic device 1501 and a first external electronic device 1502, a second external electronic device 1504, or a server 1506 may connect with each other through a network 1562 or local-area communication 1564. The electronic device 1501 may include a bus 1510, a processor 1520, a memory 1530, an input and output interface 1550, a display 1560, and a communication interface 1570. In various embodiments, at least one of the components may be omitted from the electronic device 1501, or other components may be additionally included in the electronic device 1501.

The bus 1510 may be, for example, a circuit which connects the components 1520 to 1570 with each other and transmits a communication signal (e.g., a control message and/or data) between the components.

The processor 1520 may include one or more of a CPU, an AP, or a communication processor (CP). For example, the processor 1520 may perform calculation or data processing about control and/or communication of at least another of the components of the electronic device 1501.

The memory 1530 may include a volatile and/or nonvolatile memory. The memory 1530 may store, for example, a command or data associated with at least another of the components of the electronic device 1501. According to an embodiment, the memory 1530 may store software and/or a program 1540. The program 1540 may include, for example, a kernel 1541, a middleware 1543, an application programming interface (API) 1545, and/or an at least one application program 1547 (or "at least one application"), and the like. At least part of the kernel 1541, the middleware 1543, or the API 1545 may be referred to as an operating system (OS).

The kernel 1541 may control or manage, for example, system resources (e.g., the bus 1510, the processor 1520, or the memory 1530, and the like) used to execute an operation or function implemented in the other programs (e.g., the middleware 1543, the API 1545, or the application program 1547). Also, as the middleware 1543, the API 1545, or the application program 1547 accesses a separate component of the electronic device 1501, the kernel 1541 may provide an interface which may control or manage system resources.

The middleware 1543 may play a role as, for example, a go-between such that the API 1545 or the application program 1547 communicates with the kernel 1541 to communicate data.

Also, the middleware 1543 may process one or more work requests, received from the application program 1547, in order of priority. For example, the middleware 1543 may assign priority which may use system resources (the bus 1510, the processor 1520, or the memory 1530, and the like) of the electronic device 1501 to at least one of the at least one application program 1547. For example, the middleware 1543 may perform scheduling or load balancing for the one or more work requests by processing the one or more work requests in order of the priority assigned to the at least one of the at least one application program 1547.

The API 1545 may be, for example, an interface in which the application program 1547 controls a function provided from the kernel 1541 or the middleware 1543. For example, the API 1545 may include at least one interface or function (e.g., a command) for file control, window control, image processing, or text control, and the like.

The input and output interface 1550 may play a role as, for example, an interface which may transmit a command or data input from a user or another external device to another component (or other components) of the electronic device 1501. Also, input and output interface 1550 may output an instruction or data received from another component (or other components) of the electronic device 1501 to the user or the other external device.

The display 1560 may include, for example, a liquid crystal display (LCD), a light emitting diode (LED) display, an organic LED (OLED) display, a microelectromechanical systems (MEMS) display, or an electronic paper display. The display 1560 may display, for example, a variety of content (e.g., text, images, videos, icons, or symbols, and the like) to the user. The display 1560 may include a touch screen, and may receive, for example, touch, gesture, proximity, or a hovering input using an electronic pen or part of a body of the user.

The communication interface 1570 may establish communication between, for example, the electronic device 1501 and an external device (e.g., a first external electronic device 1502, a second external electronic device 1504, or a server 1506). For example, the communication interface 1570 may connect to a network 1562 through wireless communication or wired communication and may communicate with the external device (e.g., the second external electronic device 1504 or the server 1506).

The wireless communication may use, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), or the like. Also, the wireless communication may include, for example, local-area communication 1564. The local-area communication 1564 may include, for example, at least one of wireless-fidelity (Wi-Fi) communication, Bluetooth (BT) communication, near field communication (NFC), or global navigation satellite system (GNSS) communication, and the like.

A magnetic security transmission (MST) module may generate a pulse based on transmission data using an electromagnetic signal and may generate a magnetic field signal based on the pulse. The electronic device 1501 may output the magnetic field signal to a point of sales (POS) system. The POS system may restore the data by detecting the magnetic field signal using an MST reader and converting the detected magnetic field signal into an electric signal.

The GNSS may include, for example, at least one of a GPS, a Glonass, a Beidou navigation satellite system (hereinafter referred to as "Beidou"), or a Galileo (i.e., the European global satellite-based navigation system) according to an available area or a bandwidth, and the like. Hereinafter, the "GPS" used herein may be interchangeably with the "GNSS". The wired communication may include at least one of, for example, universal serial bus (USB) communication, high definition multimedia interface (HDMI) communication, recommended standard 232 (RS-232) communication, or plain old telephone service (POTS) communication, or the like. The network 1562 may include a telecommunications network, for example, at least one of a computer network (e.g., a local area network (LAN) or a wide area network (WAN)), the Internet, or a telephone network.

Each of the first and second external electronic devices 1502 and 1504 may be the same as or different device from the electronic device 1501. According to an embodiment, the server 1506 may include a group of one or more servers. According to various embodiments, all or some of operations executed in the electronic device 1501 may be executed in another electronic device or a plurality of electronic devices (e.g., the first external electronic device 1502, the second external electronic device 1504, or the server 1506). According to an embodiment, if the electronic device 1501 should perform any function or service automatically or according to a request, it may request another device (e.g., the first external electronic device 1502, the second external electronic device 1504, or the server 106) to perform at least part of the function or service, rather than executing the function or service for itself or in addition to the function or service. The other electronic device (e.g., the first external electronic device 1502, the second external electronic device 1504, or the server 1506) may execute the requested function or the added function and may transmit the executed result to the electronic device 1501. The electronic device 1501 may process the received result without change or additionally and may provide the requested function or service. For this purpose, for example, cloud computing technologies, distributed computing technologies, or client-server computing technologies may be used.

Figure 16:
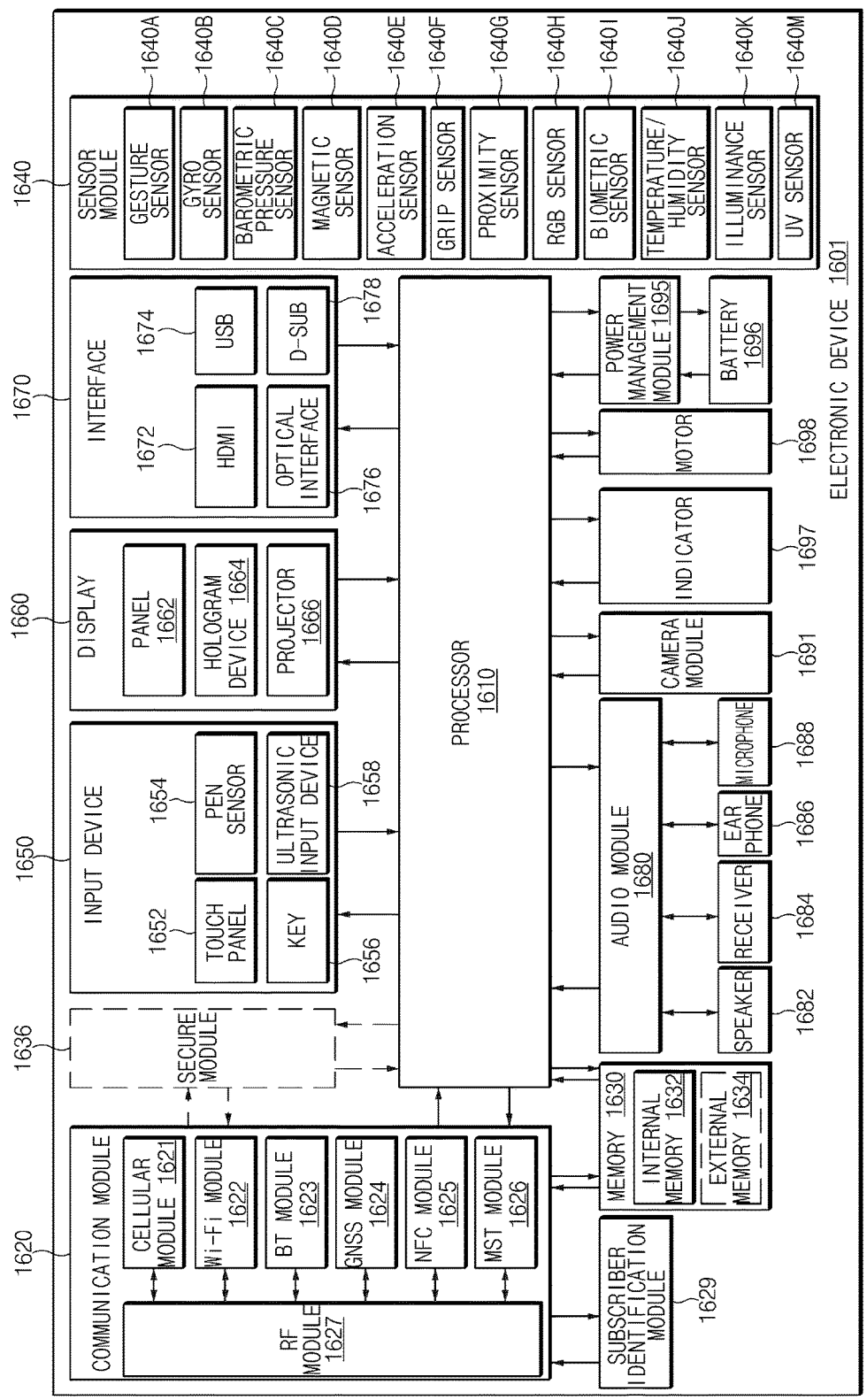
FIG. 16 is a block diagram of an electronic device according to various embodiments of the present disclosure.

FIG. 16 is a block diagram illustrating a configuration of an electronic device according to various embodiments of the present disclosure.

Referring to FIG. 16, the electronic device 1601 may include, for example, all or part of an electronic device 1501 shown in FIG. 15. The electronic device 1601 may include one or more processors 1610 (e.g., APs), a communication module 1620, a subscriber identification module (SIM) 1629, a memory 1630, a security module 1636, a sensor module 1640, an input device 1650, a display 1660, an interface 1670, an audio module 1680, a camera module 1691, a power management module 1695, a battery 1696, an indicator 1697, and a motor 1698.

The processor 1610 may drive, for example, an OS or an application program to control a plurality of hardware or software components connected thereto and may process and compute a variety of data. The processor 1610 may be implemented with, for example, a system on chip (SoC). According to an embodiment, the processor 1610 may include a graphic processing unit (GPU) (not shown) and/or an image signal processor (ISP) (not shown). The processor 1610 may include at least some (e.g., a cellular module 1621) of the components shown in FIG. 16. The processor 1610 may load a command or data received from at least one of other components (e.g., a non-volatile memory) into a volatile memory to process the data and may store various data in a non-volatile memory.

The communication module 1620 may have the same or similar configuration to a communication interface 1570 of FIG. 15. The communication module 1620 may include, for example, the cellular module 1621, a Wi-Fi module 1622, a BT module 1623, a GNSS module 1624 (e.g., a GPS module, a Glonass module, a Beidou module, or a Galileo module), a NFC module 1625, an MST module 1626, and a radio frequency (RF) module 1627.

The cellular module 1621 may provide, for example, a voice call service, a video call service, a text message service, or an Internet service, and the like through a communication network. According to an embodiment, the cellular module 1621 may identify and authenticate the electronic device 1601 in a communication network using the SIM 1629 (e.g., a SIM card). According to an embodiment, the cellular module 1621 may perform at least part of functions which may be provided by the processor 1610. According to an embodiment, the cellular module 1621 may include a CP.

The Wi-Fi module 1622, the BT module 1623, the GNSS module 1624, the NFC module 1625, or the MST module 1626 may include, for example, a processor for processing data transmitted and received through the corresponding module. According to various embodiments, at least some (e.g., two or more) of the cellular module 1621, the Wi-Fi module 1622, the BT module 1623, the GNSS module 1624, the NFC module 1625, or the MST module 1626 may be included in one integrated chip (IC) or one IC package.

The RF module 1627 may transmit and receive, for example, a communication signal (e.g., an RF signal). Though not shown, the RF module 1627 may include, for example, a transceiver, a power amplifier module (PAM), a frequency filter, or a low noise amplifier (LNA), or an antenna, and the like. According to another embodiment, at least one of the cellular module 1621, the Wi-Fi module 1622, the BT module 1623, the GNSS module 1624, the NFC module 1625, or the MST module 1626 may transmit and receive an RF signal through a separate RF module.

The SIM 1629 may include, for example, a card which includes a SIM and/or an embedded SIM. The SIM 1629 may include unique identification information (e.g., an integrated circuit card identifier (ICCID)) or subscriber information (e.g., an international mobile subscriber identity (IMSI)).

The memory 1630 (e.g., a memory 1530 of FIG. 15) may include, for example, an embedded memory 1632 or an external memory 1634. The embedded memory 1632 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 1634 may include a flash drive, for example, a compact flash (CF), a secure digital (SD), a micro-SD, a mini-SD, an extreme digital (xD), a multimedia card (MMC), or a memory stick, and the like. The external memory 1634 may operatively and/or physically connect with the electronic device 1601 through various interfaces.

The secure module 1636 may be a module which has a relatively higher secure level than the memory 1630 and may be a circuit which stores secure data and guarantees a protected execution environment. The secure module 1636 may be implemented with a separate circuit and may include a separate processor. The secure module 1636 may include, for example, an embedded secure element (eSE) which is present in a removable smart chip or a removable SD card or is embedded in a fixed chip of the electronic device 1601. Also, the secure module 1636 may be driven by an OS different from the OS of the electronic device 1601. For example, the secure module 1636 may operate based on a java card open platform (JCOP) OS.

The sensor module 1640 may measure, for example, a physical quantity or may detect an operation state of the electronic device 1601, and may convert the measured or detected information to an electric signal. The sensor module 1640 may include at least one of, for example, a gesture sensor 1640A, a gyro sensor 1640B, a barometric pressure sensor 1640C, a magnetic sensor 1640D, an acceleration sensor 1640E, a grip sensor 1640F, a proximity sensor 1640G, a color sensor 1640H (e.g., red, green, blue (RGB) sensor), a biometric sensor 1640I, a temperature/humidity sensor 1640J, an illumination sensor 1640K, or an ultraviolet (UV) sensor 1640M. Additionally or alternatively, the sensor module 1640 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 1640 may further include a control circuit for controlling at least one or more sensors included therein. According to various embodiments, the electronic device 1601 may further include a processor configured to control the sensor module 1640, as part of the processor 1610 or to be independent of the processor 1610. While the processor 1610 is in a sleep state, the electronic device 1601 may control the sensor module 1640.

The input device 1650 may include, for example, a touch panel 1652, a (digital) pen sensor 1654, a key 1656, or an ultrasonic input device 1658. The touch panel 1652 may use at least one of, for example, a capacitive type, a resistive type, an infrared type, or an ultrasonic type. Also, the touch panel 1652 may further include a control circuit. The touch panel 1652 may further include a tactile layer and may provide a tactile reaction to a user.

The (digital) pen sensor 1654 may be, for example, part of the touch panel 1652 or may include a separate sheet for recognition. The key 1656 may include, for example, a physical button, an optical key, or a keypad. The ultrasonic input device 1658 may allow the electronic device 1601 to detect a sound wave using a microphone (e.g., a microphone 1688) and to verify data through an input tool generating an ultrasonic signal.

The display 1660 (e.g., a display 1560 of FIG. 15) may include a panel 1662, a hologram device 1664, or a projector 1666. The panel 1662 may include the same or similar configuration to the display 1370 or 1560. The panel 1662 may be implemented to be, for example, flexible, transparent, or wearable. The panel 1662 and the touch panel 1652 may be integrated into one module. The hologram device 1664 may show a stereoscopic image in a space using interference of light. The projector 1666 may project light onto a screen to display an image. The screen may be positioned, for example, inside or outside the electronic device 1601. According to an embodiment, the display 1660 may further include a control circuit for controlling the panel 1662, the hologram device 1664, or the projector 1666.

The interface 1670 may include, for example, a HDMI 1672, a USB 1674, an optical interface 1676, or a D-subminiature 1678. The interface 1670 may be included in, for example, a communication interface 170 or 1570 shown in FIG. 2 or 15. Additionally or alternatively, the interface 1670 may include, for example, a mobile high definition link (MHL) interface, an SD card/multimedia card (MMC) interface, or an infrared data association (IrDA) standard interface.

The audio module 1680 may convert a sound and an electric signal in dual directions. At least part of components of the audio module 1680 may be included in, for example, an input and output interface 1550 (or a user interface) shown in FIG. 15. The audio module 1680 may process sound information input or output through, for example, a speaker 1682, a receiver 1684, an earphone 1686, or the microphone 1688, and the like.

The camera module 1691 may be a device which captures a still image and a moving image. According to an embodiment, the camera module 1691 may include one or more image sensors (not shown) (e.g., a front sensor or a rear sensor), a lens (not shown), an ISP (not shown), or a flash (not shown) (e.g., an LED or a xenon lamp).

The power management module 1695 may manage, for example, power of the electronic device 1601. According to an embodiment, though not shown, the power management module 1695 may include a power management integrated circuit (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 1696 and voltage, current, or temperature thereof while the battery 1696 is charged. The battery 1696 may include, for example, a rechargeable battery or a solar battery.

The indicator 1697 may display a specific state of the electronic device 1601 or part (e.g., the processor 1610) thereof, for example, a booting state, a message state, or a charging state, and the like. The motor 1698 may convert an electric signal into mechanical vibration and may generate vibration or a haptic effect, and the like. Though not shown, the electronic device 1601 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a mediaFlo™ standard, and the like.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

Figure 17:
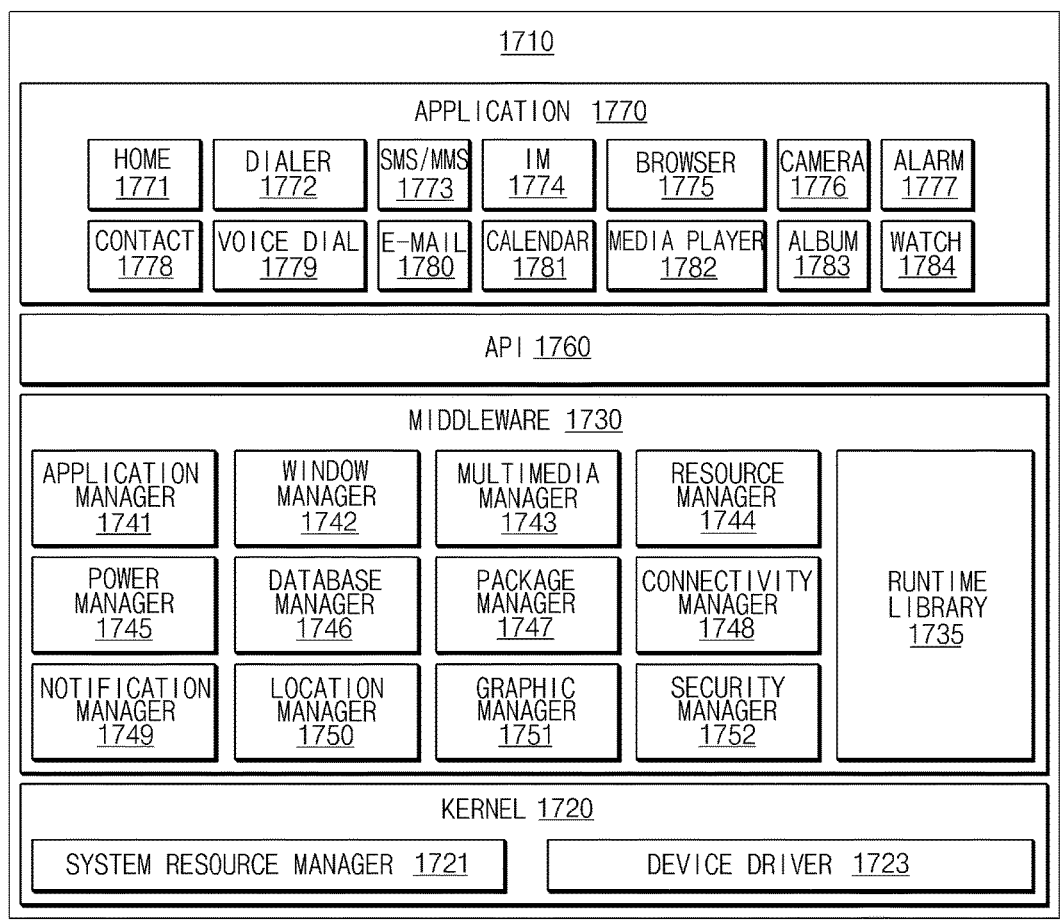
FIG. 17 is a block diagram of a program module according to various embodiments of the present disclosure.

FIG. 17 is a block diagram illustrating a configuration of a program module according to various embodiments of the present disclosure.

Referring to FIG. 17, according to an embodiment, the program module 1710 (e.g., a program 1540 of FIG. 15) may include an OS for controlling resources associated with an electronic device (e.g., an electronic device 1501 of FIG. 15) and/or various applications (e.g., an application program 1547 of FIG. 15) which are executed on the OS. The OS may be, for example, Android, iOS, Windows, Symbian, Tizen, or Bada, and the like.

The program module 1710 may include a kernel 1720, a middleware 1730, an API 1760, and/or an application 1770. At least part of the program module 1710 may be preloaded on the electronic device, or may be downloaded from an external electronic device (e.g., a first external electronic device 1502, a second external electronic device 1504, or a server 1506, and the like of FIG. 15).

The kernel 1720 (e.g., a kernel 1541 of FIG. 15) may include, for example, a system resource manager 1721 and/or a device driver 1723. The system resource manager 1721 may control, assign, or collect, and the like system resources. According to an embodiment, the system resource manager 1721 may include a process management unit, a memory management unit, or a file system management unit, and the like. The device driver 1723 may include, for example, a display driver, a camera driver, a BT driver, a shared memory driver, a USB driver, a keypad driver, a Wi-Fi driver, an audio driver, or an inter-process communication (IPC) driver.

The middleware 1730 (e.g., a middleware 1543 of FIG. 15) may provide, for example, functions the application 1770 use in common, and may provide various functions to the application 1770 through the API 1760 such that the application 1770 efficiently uses limited system resources in the electronic device. According to an embodiment, the middleware 1730 (e.g., the middleware 1543) may include at least one of a runtime library 1735, an application manager 1741, a window manager 1742, a multimedia manager 1743, a resource manager 1744, a power manager 1745, a database manager 1746, a package manager 1747, a connectivity manager 1748, a notification manager 1749, a location manager 1750, a graphic manager 1751, a security manager 1752, or another manager such as a payment manager.

The runtime library 1735 may include, for example, a library module used by a compiler to add a new function through a programming language while the application 1770 is executed. The runtime library 1735 may perform a function about input and output management, memory management, or an arithmetic function.

The application manager 1741 may manage, for example, a life cycle of at least one of the application 1770. The window manager 1742 may manage graphic user interface (GUI) resources used on a screen of the electronic device. The multimedia manager 1743 may determine a format utilized for reproducing various media files and may encode or decode a media file using a codec corresponding to the corresponding format. The resource manager 1744 may manage source codes of at least one of the application 1770, and may manage resources of a memory or a storage space, and the like.

The power manager 1745 may act together with, for example, a basic input/output system (BIOS) and the like, may manage a battery or a power source, and may provide power information utilized for an operation of the electronic device. The database manager 1746 may generate, search, or change a database to be used in at least one of the application 1770. The package manager 1747 may manage installation or update of an application distributed by a type of a package file.

The connectivity manager 1748 may manage, for example, wireless connection such as Wi-Fi connection or BT connection, and the like. The notification manager 1749 may display or notify events, such as an arrival message, an appointment, and proximity notification, by a method which is not disturbed to the user. The location manager 1750 may manage location information of the electronic device. The graphic manager 1751 may manage a graphic effect to be provided to the user or a user interface (UI) related to the graphic effect. The security manager 1752 may provide all security functions utilized for system security or user authentication, and the like. According to an embodiment, when the electronic device (e.g., an electronic device 1300 or 1501 of FIG. 13 or 15) has a phone function, the middleware 1730 may further include a telephony manager (not shown) for managing a voice or video communication function of the electronic device.

The middleware 1730 may include a middleware module which configures combinations of various functions of the above-described components. The middleware 1730 may provide a module which specializes according to kinds of OSs to provide a differentiated function. Also, the middleware 1730 may dynamically delete some of old components or may add new components.

The API 1760 (e.g., an API 1545 of FIG. 15) may be, for example, a set of API programming functions, and may be provided with different components according to OSs. For example, in case of Android or iOS, one API set may be provided according to platforms. In case of Tizen, two or more API sets may be provided according to platforms.

The application 1770 (e.g., an application program 1547 of FIG. 15) may include one or more of, for example, a home application 1771, a dialer application 1772, a short message service/multimedia message service (SMS/MMS) application 1773, an instant message (IM) application 1774, a browser application 1775, a camera application 1776, an alarm application 1777, a contact application 1778, a voice dial application 1779, an e-mail application 1780, a calendar application 1781, a media player application 1782, an album application 1783, a watch application 1784, a health care application (e.g., an application for measuring quantity of exercise or blood sugar, and the like), or an environment information application (e.g., an application for providing atmospheric pressure information, humidity information, or temperature information, and the like), and the like.

According to an embodiment, the application 1770 may include an application (hereinafter, for better understanding and ease of description, referred to as "information exchange application") for exchanging information between the electronic device (e.g., the electronic device 1501 of FIG. 15) and an external electronic device (e.g., the first external electronic device 1502 or the second external electronic device 1504). The information exchange application may include, for example, a notification relay application for transmitting specific information to the external electronic device or a device management application for managing the external electronic device.

For example, the notification relay application may include a function of transmitting notification information, which is generated by other applications (e.g., the SMS/

MMS application, the e-mail application, the health care application, or the environment information application, and the like) of the electronic device, to the external electronic device (e.g., the first external electronic device 1502 or the second external electronic device 1504). Also, the notification relay application may receive, for example, notification information from the external electronic device, and may provide the received notification information to the user of the electronic device.

The device management application may manage (e.g., install, delete, or update), for example, at least one (e.g., a function of turning on/off the external electronic device itself (or partial components) or a function of adjusting brightness (or resolution) of a display) of functions of the external electronic device (e.g., the first external electronic device 1502 or the second external electronic device 1504) which communicates with the electronic device, an application which operates in the external electronic device, or a service (e.g., a call service or a message service) provided from the external electronic device.

According to an embodiment, the application 1770 may include an application (e.g., the health card application of a mobile medical device) which is preset according to attributes of the external electronic device (e.g., the first external electronic device 1502 or the second external electronic device 1504). According to an embodiment, the application 1770 may include an application received from the external electronic device (e.g., the server 1506, the first external electronic device 1502, or the second external electronic device 1504). According to an embodiment, the application 1770 may include a preloaded application or a third party application which may be downloaded from a server. Names of the components of the program module 1710 according to various embodiments of the present disclosure may differ according to kinds of OSs.

According to various embodiments, at least part of the program module 1710 may be implemented with software, firmware, hardware, or at least two or more combinations thereof. At least part of the program module 1710 may be implemented (e.g., executed) by, for example, a processor (e.g., a processor 1520 of FIG. 15). At least part of the program module 1710 may include, for example, a module, a program, a routine, sets of instructions, or a process, and the like for performing one or more functions.

The terminology "module" used herein may mean, for example, a unit including one of hardware, software, and firmware or two or more combinations thereof. The terminology "module" may be interchangeably used with, for example, terminologies "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

According to various embodiments of the present disclosure, at least part of a device (e.g., modules or the functions) or a method (e.g., operations) may be implemented with, for example, instructions stored in a non-transitory computer-readable storage media which have a program module. When the instructions are executed by a processor, one or more processors may perform functions corresponding to the instructions. The non-transitory computer-readable storage media may be, for example, a memory.

The non-transitory computer-readable storage media may include a hard disc, a floppy disk, magnetic media (e.g., a magnetic tape), optical media (e.g., a compact disc ROM (CD-ROM) and a DVD), magneto-optical media (e.g., a floptical disk), a hardware device (e.g., a ROM, a read-only memory (RAM), or a flash memory, and the like), and the like. Also, the program instructions may include not only mechanical codes compiled by a compiler but also high-level language codes which may be executed by a computer using an interpreter and the like. The above-mentioned hardware device may be configured to operate as one or more software modules to perform operations according to various embodiments of the present disclosure, and vice versa.

Modules or program modules according to various embodiments of the present disclosure may include at least one or more of the above-mentioned components, some of the above-mentioned components may be omitted, or other additional components may be further included. Operations executed by modules, program modules, or other components may be executed by a successive method, a parallel method, a repeated method, or a heuristic method. Also, some operations may be executed in a different order or may be omitted, and other operations may be added.

Embodiments of the present disclosure described and shown in the drawings are provided as examples to describe technical content and help understanding but do not limit the present disclosure. Accordingly, it should be interpreted that besides the embodiments listed herein, all modifications or modified forms derived based on the technical ideas of the present disclosure are included in the present disclosure as defined in the claims, and their equivalents.

The above-described embodiments of the present disclosure can be implemented in hardware, firmware or via the execution of software or computer code that can be stored in a recording medium such as a CD ROM, a DVD, a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The control unit may include a microprocessor or any suitable type of processing circuitry, such as one or more general-purpose processors (e.g., ARM-based processors), a digital signal processor (DSP), a programmable logic device (PLD), an ASIC, a FPGA, a GPU, a video card controller, etc. In addition, it would be recognized that when a general purpose computer accesses code for implementing the processing shown herein, the execution of the code transforms the general purpose computer into a special purpose computer for executing the processing shown herein. Any of the functions and operations provided in the Figures may be implemented in hardware, software or a combination of both and may be performed in whole or in part within the programmed instructions of a computer. In addition, an artisan understands and appreciates that a "processor" or "microprocessor" may be hardware in the claimed disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A camera module comprising:
a lens barrel including at least one lens and a lens hole; and
a variable aperture including an aperture hole area which is arranged on the lens hole formed in the lens barrel,
wherein a size of the aperture hole area is adjustable,
wherein an outer surface of an outermost lens of the lens barrel protrudes further to the outer side nearer the central portion than a periphery of the aperture hole area of the variable aperture,
wherein the variable aperture includes at least two wing parts,
wherein the at least two wing parts are configured to move while partially overlapping each other, and
wherein the at least two wing parts include:
a wing; and
a wing hole disposed in the wing and forming the aperture hole area while the size of an overlapping area is changed as the at least two wing parts are moved.

2. The camera module of claim 1, wherein the at least two wing parts include:
a wing support configured to support the wing;
a wing holder extending from the wing support; and
a lever protruding from one side of the wing holder.

3. The camera module of claim 2, further comprising:
an aperture driving module configured to adjust movement of a wing part of the at least two wing parts by moving the lever in a specific direction.

4. The camera module of claim 3, wherein the aperture driving module includes:
a support in which the lever is inserted into one side thereof;
a magnet member disposed on one side of the support;
a coil configured to interact with the magnet member to move the support in a second specific direction; and
an aperture driving integrated circuit (IC) configured to control supply of electric power to the coil.

5. The camera module of claim 1, wherein the at least two wing parts include:
a connection boss formed on one side of the wing and configured to function as an axis such that a wing part of the at least two wing parts moves in one direction while being engaged with another wing part of the at least two wing parts; or
a connection hole formed on one side of the wing, into which the connection boss is inserted, and configured to move along an inner peripheral surface of the connection boss.

6. The camera module of claim 1, further comprising:
a first movable carrier, on which the lens barrel is seated;
an aperture fixing unit configured to fix the variable aperture on the first movable carrier;
a stopper disposed on the variable aperture and configured to prevent deviation of the variable aperture;
a housing, on which the lens barrel and the variable aperture are seated; and
a shield covering the lens barrel and the variable aperture.

7. The camera module of claim 6, further comprising:
at least one magnet member disposed on one side of the first movable carrier and involving in horizontal movement of the first movable carrier;
a coil configured to interact with the at least one magnet member to move the first movable carrier in a specific direction; and
a driving integrated circuit (IC) configured to control supply of electric power to the coil.

8. The camera module of claim 1, wherein the at least two wing parts include:
a first wing part including a first wing hole of a specific size and configured to move in a specific angle range; and
a second wing part including a second wing hole of a specific size, which forms the aperture hole area, at least a portion of which is aligned with the lens hole while at least partially overlapping the first wing hole and configured to move in a specific angle range.

9. The camera module of claim 8, wherein the first wing hole and the second wing hole are formed as a plurality of holes of different diameters partially overlapping each other.

10. The camera module of claim 1,
wherein the variable aperture is disposed on the lens barrel, and
wherein the camera module further comprises:
a second movable carrier, on which the lens barrel is seated; and
a magnet member disposed on one side of the second movable carrier, disposed to face a coil of a specific location, and related to upward and downward movement of the second movable carrier.

11. The camera module of claim 1, wherein the lens barrel further includes:
an aperture holder protruding from an outer wall of the lens barrel and supporting one side of the variable aperture.

12. An electronic device comprising:
a case;
a camera module, at least a portion of which is exposed through a hole formed in the case; and
a processor electrically connected to the camera module,
wherein the camera module includes:
a lens barrel including at least one lens and a lens hole;
a variable aperture including an aperture hole area which is arranged on the lens hole formed in the lens barrel, a size of the aperture hole area being adjustable; and
an aperture driving module configured to control adjustment of the size of the aperture hole area
wherein an outer surface of an outermost lens of the lens barrel protrudes further to the outer side nearer the central portion than a periphery of the aperture hole area of the variable aperture,
wherein the variable aperture includes at least two wing parts,
wherein the at least two wing parts are configured to move while partially overlapping each other, and
wherein the at least two wing parts include:
a wing; and
a wing hole disposed in the wing and forming the aperture hole area while the size of an overlapping area is changed as the at least two wing parts are moved.

13. The electronic device of claim 12, wherein the processor is configured to:
  if execution of a pan focusing function is requested, transmit a control signal to perform a control such that the size of the aperture hole area is a largest adjustable size.

14. The electronic device of claim 12, wherein the processor is configured to:
  if execution of an out-focusing function is requested, transmit a control signal to perform a control such that the size of the aperture hole area is a smallest adjustable size.

15. The electronic device of claim 12, further comprising:
  a sensor configured to sense illumination intensity information,
  wherein the processor is configured to:
    determine an intensity of illumination of the outside based on the illumination intensity information; and
    when the intensity of illumination of the outside is a specific value or less, transmit a control signal to perform a control such that the size of the aperture hole area has a first size.

16. The electronic device of claim 15, wherein the processor is configured to:
  when the intensity of illumination of the outside exceeds a specific illumination intensity, transmit a control signal to perform a control such that the size of the aperture hole area has a second size that is smaller than the first size.

17. The electronic device of claim 12, further comprising:
  a display configured to output state information corresponding to the size of the aperture hole area of the variable aperture.

* * * * *